(12) United States Patent
Ezair et al.

(10) Patent No.: US 11,170,570 B2
(45) Date of Patent: Nov. 9, 2021

(54) SYSTEMS AND METHODS FOR ADDITIVE MANUFACTURING

(71) Applicant: Technion Research & Development Foundation Limited, Haifa (IL)

(72) Inventors: Ben Ezair, Haifa (IL); Gershon Elber, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 656 days.

(21) Appl. No.: 16/013,967

(22) Filed: Jun. 21, 2018

(65) Prior Publication Data

US 2018/0374262 A1 Dec. 27, 2018

Related U.S. Application Data

(60) Provisional application No. 62/522,814, filed on Jun. 21, 2017.

(51) Int. Cl.
   *G06T 17/10* (2006.01)
   *G06T 17/30* (2006.01)
   (Continued)

(52) U.S. Cl.
   CPC ........... *G06T 17/10* (2013.01); *B29C 64/393* (2017.08); *G05B 19/4099* (2013.01);
   (Continued)

(58) Field of Classification Search
   CPC ......... G06T 17/10; G06T 17/30; G06T 19/20; B29C 64/393; G05B 19/4099
   See application file for complete search history.

(56) References Cited

U.S. PATENT DOCUMENTS

2015/0269289 A1* 9/2015 Kim .................. G06F 30/20 703/6
2018/0032059 A1* 2/2018 Morovic ............... B29C 64/386
(Continued)

OTHER PUBLICATIONS

Sasaki, Yuhi, Masahito Takezawa, Seungki Kim, Hiroshi Kawaharada, and Takashi Maekawa. "Adaptive direct slicing of volumetric attribute data represented by trivariate B-spline functions." The International Journal of Advanced Manufacturing Technology 91, No. 5-8 (2017): 1791-1807. (Year: 2016).*

(Continued)

*Primary Examiner* — Chuen-Meei Gan

(57) ABSTRACT

There is provided a method of generating instructions for manufacturing of a functionally graded material (FGM) object, comprising: providing geometric trivariate(s) defining geometry of FGM object, providing material trivariate(s) defining material properties of the FGM object, computing a volumetric representation of the FGM object that includes the geometric trivariate(s) and the material trivariate(s) spanning a same parametric domain, and computing code instructions for execution by a manufacturing device controller of a manufacturing device for manufacturing of the FGM object by: identifying locations within the boundaries defined by the geometric trivariate(s) of the volumetric representation, computing respective material value(s) for each of the locations according to the material trivariate(s) of the volumetric representation corresponding to the identified locations, and converting the locations from the parametric domain to the Euclidean space, wherein each of the locations in Euclidean space is associated with the respective material value(s).

19 Claims, 7 Drawing Sheets

(51) Int. Cl.
  *B29C 64/393* (2017.01)
  *G05B 19/4099* (2006.01)
  *G06T 19/20* (2011.01)
  *B33Y 10/00* (2015.01)
  *B33Y 50/02* (2015.01)

(52) U.S. Cl.
  CPC .............. *G06T 17/30* (2013.01); *G06T 19/20* (2013.01); *B33Y 10/00* (2014.12); *B33Y 50/02* (2014.12); *G05B 2219/49008* (2013.01); *G06T 2219/2024* (2013.01)

(56) References Cited

U.S. PATENT DOCUMENTS

2018/0240263 A1* 8/2018 Courier .................. B33Y 50/02
2018/0275637 A1* 9/2018 Elber ...................... G06T 17/10
2019/0130642 A1* 5/2019 Elber ...................... G06T 15/08
2020/0320784 A1* 10/2020 Elber ...................... G06T 15/08

OTHER PUBLICATIONS

Massarwi, Fady, and Gershon Elber. "A B-spline based framework for volumetric object modeling." Computer-Aided Design 78 (2016): 36-47. (Year: 2016).*

Ezair, Ben, Fady Massarwi, and Gershon Elber. "Orientation analysis of 3D objects toward minimal support volume in 3D-printing." Computers & Graphics 51 (2015): 117-124. (Year: 2015).*

Ezair, Ben, and G. Elber. "Fabricating functionally graded material objects using trimmed trivariate volumetric representations." In Proceedings of SMI. 2017. (Year: 2017).*

Doubrovski, E.L., Tsai, E.Y., Dikovsky, D., Geraedts, J.M., Herr, H. and Oxman, N., 2015. Voxel-based fabrication through material property mapping: A design method for bitmap printing. Computer-Aided Design, 60, pp. 3-13. (Year: 2015).*

* cited by examiner

Input:

(1) $FGM_{obj} = \{FGM_{cell(1)}, \ldots, FGM_{cell(n)}\}$, a complex of $n$ FGM cells;

(2) $m$, the number of materials;

(3) $z$, the height of the slice;

(4) $x_{res}, y_{res}$, the resolution (in pixels) of the required bitmap(s);

Output:

(1) $B = \{B_1, \ldots, B_m\}$, a set of bitmaps;

Pseudocode:

1: $(x_{min}, x_{max}, y_{min}, y_{max}) := BoundingRectangleXY(FGM)$;
2: $(dx, dy) := (\frac{x_{max}-x_{min}}{x_{res}}, \frac{y_{max}-y_{min}}{y_{res}})$;
3: $M_g := EmptyGrid(x_{res}, y_{res})$; // A 2D matrix of vectors.
4: for $i = 1; i \leq n; i = i + 1;$ do // Iterate over all the cells.
5:  $(V, M, S) := FGM_{cell(i)}$;
6:  $O := SSI(S, Plane(z))$; // Surfaces-plane outline intersection.
7:  for $x = x_{min}; x \leq x_{max}; x = x + dx$ do
8:   $\mathcal{Y} := Intersection(Line(X = x), O)$; // A set of $y$-aligned intervals.
9:   for all $Y \in \mathcal{Y}$ do
10:    $(u, v, w) := FullSolve(V, x, \min_y(Y), z)$;
11:    for $y = \min_y(Y); y \leq \max_y(Y); y = y + dy$ do
12:     $(u, v, w) := NumericSolve(V, x, y, z, u, v, w)$;
13:     if $V(u, v, w) \neq (x, y, z)$ then
14:      $(u, v, w) := FullSolve(V, x, y, z)$;
15:     end if
16:     $(x_i, y_i) = \left(floor\left(x_{res}\frac{x-x_{min}}{x_{max}-x_{min}}\right), floor\left(y_{res}\frac{y-y_{min}}{y_{max}-y_{min}}\right)\right)$;
17:     $M_g(x_i, y_i) := M(u, v, w)$;
18:    end for
19:   end for
20:  end for
21: end for
22: $M_{dither} := Dither(M_g)$;
23: $B := BitmapPerMaterial(M_{dither}, m)$;
24: Return $B$;

SYSTEMS AND METHODS FOR ADDITIVE MANUFACTURING

RELATED APPLICATION

This application claims the benefit of priority under 35 USC § 119(e) of U.S. Provisional Patent Application No. 62/522,814 filed on Jun. 21, 2017. The contents of the above application are all incorporated by reference as if fully set forth herein in their entirety.

BACKGROUND

The present invention, in some embodiments thereof, relates to object representations and, more specifically, but not exclusively, to object representations for manufacturing.

Functionally graded materials (FGMs) are heterogeneous materials created by mixing/interleaving two or more materials, inside the volume of some object, in a way that varies according to position, for example, as described with reference to Victor Birman and Larry W Byrd. *Modeling and analysis of functionally graded materials and structures. Applied mechanics reviews,* 60(5):195-216, 2007. The spatial variation in FGMs may be designed to achieve some overall physical property, in the object. FGMs are becoming more popular in engineering due to their increased availability through additive manufacturing (AM), and because objects made using FGMs can often achieve functional properties that are superior to those that can be achieved by objects made from a homogenous material.

3D printers that support heterogeneous materials are becoming more and more common, in recent years. Multi-material 3D printers based on the PolyJet 3D printing technology (e.g., Objet Connex series as described with reference to E L Doubrovski, E Y Tsai, D Dikovsky, J M P Geraedts, Hugh Herr, and Neri Oxman. *Voxel-based fabrication through material property mapping: A design method for bitmap printing. Computer-Aided Design,* 60:3-13, 2015 are capable of producing FGM objects of almost any shape, and with many material properties by combining different materials at high resolution. Other examples for printers that use a similar ink jet approach include the ProJet as described with reference to 3D Systems, Inc. ProJet MJP 5500*X*. https://www(dot)3dsystems(dot)com/3d-printers/projet-mjp-5500x, 2017 and the Jet Fusion described with reference to HP Development Company, L.P. Jet Fusion. http://www(dot)hp(dot)com/us/en/printers/3d-printers(dot)html, 2017. The increased availability of multi-material 3D printers is leading to an increased interest in the use of heterogeneous materials, and in the manufacturing of FGM objects.

SUMMARY

According to a first aspect, a computer implemented method of generating instructions for manufacturing of a functionally graded material (FGM) object, comprises: providing at least one geometric trivariate defining geometry of FGM object, providing at least one material trivariate defining at least one material property of the FGM object, computing a volumetric representation of the FGM object that includes the at least one geometric trivariate and the at least one material trivariate spanning a same parametric domain, and computing code instructions for execution by a manufacturing device controller of a manufacturing device for manufacturing of the FGM object by: identifying a plurality of locations within the boundaries defined by the at least one geometric trivariate of the volumetric representation, computing at least one respective material value for each of the plurality of locations according to the at least one material trivariate of the volumetric representation corresponding to the identified plurality of locations, and converting the plurality of locations from the parametric domain to the Euclidean space, wherein each of the plurality of locations in Euclidean space is associated with the at least one respective material value.

According to a second aspect, a system for generating instructions for manufacturing of a FGM object, comprises: a non-transitory memory having stored thereon a code for execution by at least one hardware processor, the code comprising: code for obtaining at least one geometric trivariate defining geometry of FGM object, code for obtaining at least one material trivariate defining at least one material property of the FGM object, code for computing a volumetric representation of the FGM object that includes the at least one geometric trivariate and the at least one material trivariate spanning a same parametric domain, and code for computing code instructions for execution by a manufacturing device controller of a manufacturing device for manufacturing of the FGM object by: identifying a plurality of locations within the boundaries defined by the at least one geometric trivariate of the volumetric representation, computing at least one respective material value for each of the plurality of locations according to the at least one material trivariate of the volumetric representation corresponding to the identified plurality of locations, and converting the plurality of locations from the parametric domain to the Euclidean space, wherein each of the plurality of locations in Euclidean space is associated with the at least one respective material value.

According to a third aspect, a computer program product for generating instructions for manufacturing of a FGM object, comprises: a non-transitory memory having stored thereon a code for execution by at least one hardware processor, the code comprising: instructions for obtaining at least one geometric trivariate defining geometry of FGM object, instructions for obtaining at least one material trivariate defining at least one material property of the FGM object, instructions for computing a volumetric representation of the FGM object that includes the at least one geometric trivariate and the at least one material trivariate spanning a same parametric domain, and instructions for computing code instructions for execution by a manufacturing device controller of a manufacturing device for manufacturing of the FGM object by: identifying a plurality of locations within the boundaries defined by the at least one geometric trivariate of the volumetric representation, computing at least one respective material value for each of the plurality of locations according to the at least one material trivariate of the volumetric representation corresponding to the identified plurality of locations, and converting the plurality of locations from the parametric domain to the Euclidean space, wherein each of the plurality of locations in Euclidean space is associated with the at least one respective material value.

At least some of the systems, apparatus, methods, and/or code instructions (i.e., stored in a data storage device executable by hardware processor(s)) described here relate to the technical problem of computing a format for representation of models of FGM objects for manufacturing. In particular, the technical problem relates to computing formats for representation of FGM objects for additive manufacturing At least some of the systems, methods, apparatus, and/or code instructions described herein relate to an improved process for generating a format for representation of an FGM object for manufacturing, optionally by an additive manufacturing device. The volumetric representation format of the FGM object described herein (based on a geometric trivariate(s) and a material trivariate(s) that are defined within a common domain) improves the computational efficiency (e.g., relatively reduced computational resource utilization, reduced computation time, and/or reduced memory requirements) of a computing device that generates instructions for additive manufacturing of a physical form of the FGM object. For example, the material composition (also referred to herein as material value) at any point in the domain of the FGM object and/or the Euclidean space of the representation of the FGM object is computed efficiency, for example, in comparison to voxels which require significant computations resources for computation of all voxels and significant memory size to store the data for all voxels.

In another example, computational efficiency of the computing device is improved by enabling division of the volumetric representation of the FGM object into sub-volumes (e.g., 2D slices), where instructions for manufacturing of each slice are computed by preventing evaluation of the locations falling outside of the sub-volume, which are irrelevant, since such external locations are not printed by the 3D printer. Moreover, each sub-volume may be computed independently of other sub-volumes, which enables parallel processing of the sub-volumes of the FGM object. Memory and/or computational resource utilization (e.g., processor(s) and/or processing time, are relatively lower in comparison to other methods of representing FGM objects for additive manufacturing thereof.

At least some of the systems, methods, apparatus, and/or code instructions described herein are able to represent large FGM objects and/or high resolution FGM objects at a resolution corresponding to the native resolution of the manufacturing device (e.g., 3D printer), which is in contrast to other systems and/or methods that are unable to represent the FGM objects according to the native resolution of the manufacturing device, and/or which are only able to represent the FGM objects according to the native resolution of the manufacturing device by including a large computational cost (e.g., high processor utilization, large amount of memory used, and/or long processing time) in comparison to the systems, methods, apparatus and/or code instructions described herein that are able to represent the FGM objects according to the native resolution of the manufacturing device with computational efficiency.

At least some of the systems, methods, apparatus, and/or code instructions described herein address the technical problem of efficiently embedding objects within the manufactured FGM object (e.g., of a different color and/or material property than the surrounding materials) and/or applying a pattern to the surface of the manufactured FGM object (e.g., of a different color and/or material property than the nearby materials). At least some of the systems, methods, apparatus, and/or code instructions described improve the computational efficiency of the computing device described herein. The computing device computes instructions for execution by the manufacturing device for manufacturing an FGM object which may have embedded objects therein and/or having a pattern thereon, as described herein. The solution to the technical problem, which improves the computational efficiency of the computing device, is based on relating material parameters defined by the material trivariate to geometry defined by the geometry trivariate, according to the common parameterization of the domain common to the geometrical trivariate and the material trivariate. It is noted that other methods that do not use such as shared parameterization based on a common domain, such as voxels and/or B-rep representation, applying a volumetric texture that would follow the geometry (i.e., within the volume and/or on the surface of the object) is much more difficult to control and computationally complex, incurring higher computational costs (e.g., in terms of higher processor utilization, longer processing time, and/or increased memory usage).

In a further implementation form of the first, second, and third aspects, the at least one geometric trivariate and the at least one material trivariate comprises trimmed trivariates.

In a further implementation form of the first, second, and third aspects, the volumetric representation of the FGM object is based on a complex of a plurality of cells, wherein each cell is associated with a set of trimmed surfaces that trim the volume of the respective at least one geometric trivariate and the at least one material trivariate corresponding to the respective cell, wherein the set of trimmed surfaces define the boundary of the corresponding cell.

In a further implementation form of the first, second, and third aspects, each cell of the complex of the plurality of cells includes a single parameterization of the at least one geometric trivariate and the at least one material trivariate.

In a further implementation form of the first, second, and third aspects, each cell of the plurality of cells comprise control points and blending functions over the control points for the at least one geometric trivariate and/or the at least one material trivariate corresponding to the respective cell.

In a further implementation form of the first, second, and third aspects, each trivariate of at least one geometric trivariate and at least one material trivariate is regular with a non-vanishing Jacobian and without global self intersections.

In a further implementation form of the first, second, and third aspects, the at least one geometric trivariate is independent of the at least one material trivariate, and the at least one material trivariate is independent of the at least one geometric trivariate.

In a further implementation form of the first, second, and third aspects, the at least one geometric trivariate and at least one material trivariate comprise parametric volumetric trivariates.

In a further implementation form of the first, second, and third aspects, the code instructions are for execution by an additive manufacturing device controller of an additive manufacturing device for additive manufacturing of the FGM object.

In a further implementation form of the first, second, and third aspects, the volumetric representation consists only of the at least one geometric trivariate and the at least one material trivariate spanning the same parametric domain.

In a further implementation form of the first, second, and third aspects, the code instructions for execution by the manufacturing device controller further comprise instructions for dividing the at least one geometric trivariate into a plurality of sub-volumes having dimensions determined according to hardware manufacturing capabilities of the manufacturing device, and wherein the identifying the plurality of locations, the computing at least one respective material value, and the converting the plurality of locations is performed per sub-volume.

In a further implementation form of the first, second, and third aspects, the plurality of sub-volumes are computed in parallel and independently of another sub-volume, and the identifying the plurality of locations, the computing at least one respective material value, and the converting the plurality of locations is performed in parallel per sub-volume and independently of another sub-volume.

In a further implementation form of the first, second, and third aspects, the code instructions for execution by the manufacturing device controller further comprise sampling a plurality of sample locations of the at least one geometrical trivariate to determine whether each respective sample location falls within outlines of the respective sub-volume, and computing the respective material value only for the respective sample location when the respective sample location falls within outlines of the respective sub-volume.

In a further implementation form of the first, second, and third aspects, the method and/or the system and/or code further comprise computing a full solution for a certain location within the outlines of the respective sub-volume, and computing a plurality of solutions for a plurality of other close-by locations in proximity to the certain location based on a numeric tracing code that iteratively uses a previous solution of another location in proximity to the certain location as an initial guess of the solution of the certain solution.

In a further implementation form of the first, second, and third aspects, sampling of locations includes at least one of: performed along straight lines aligned to the x or y axis, and performed as flood-fill.

In a further implementation form of the first, second, and third aspects, the method and/or the system and/or code further comprise converting a mix of materials defined by the at least one material trivariate into a plurality of single materials per location, and splitting a single of the volumetric representation of the FGM into a plurality of volumetric representations each denoting one respective material.

In a further implementation form of the first, second, and third aspects, a single volumetric representation of the FGM object is computed based on the at least one geometric trivariate and the at least one material trivariate.

In a further implementation form of the first, second, and third aspects, the at least one material trivariate is selected from the group consisting of: a refinement of a spline space of the at least one geometric trivariates, a procedural function, a single function per cell of the volumetric representation of the FGM object, according to analysis results, and according to material features.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is a pseudocode of a process for generating code instructions for a manufacturing device for a single sub-volume (e.g., 2D slice), in accordance to some embodiments of the present invention;

DETAILED DESCRIPTION

Figure 1:
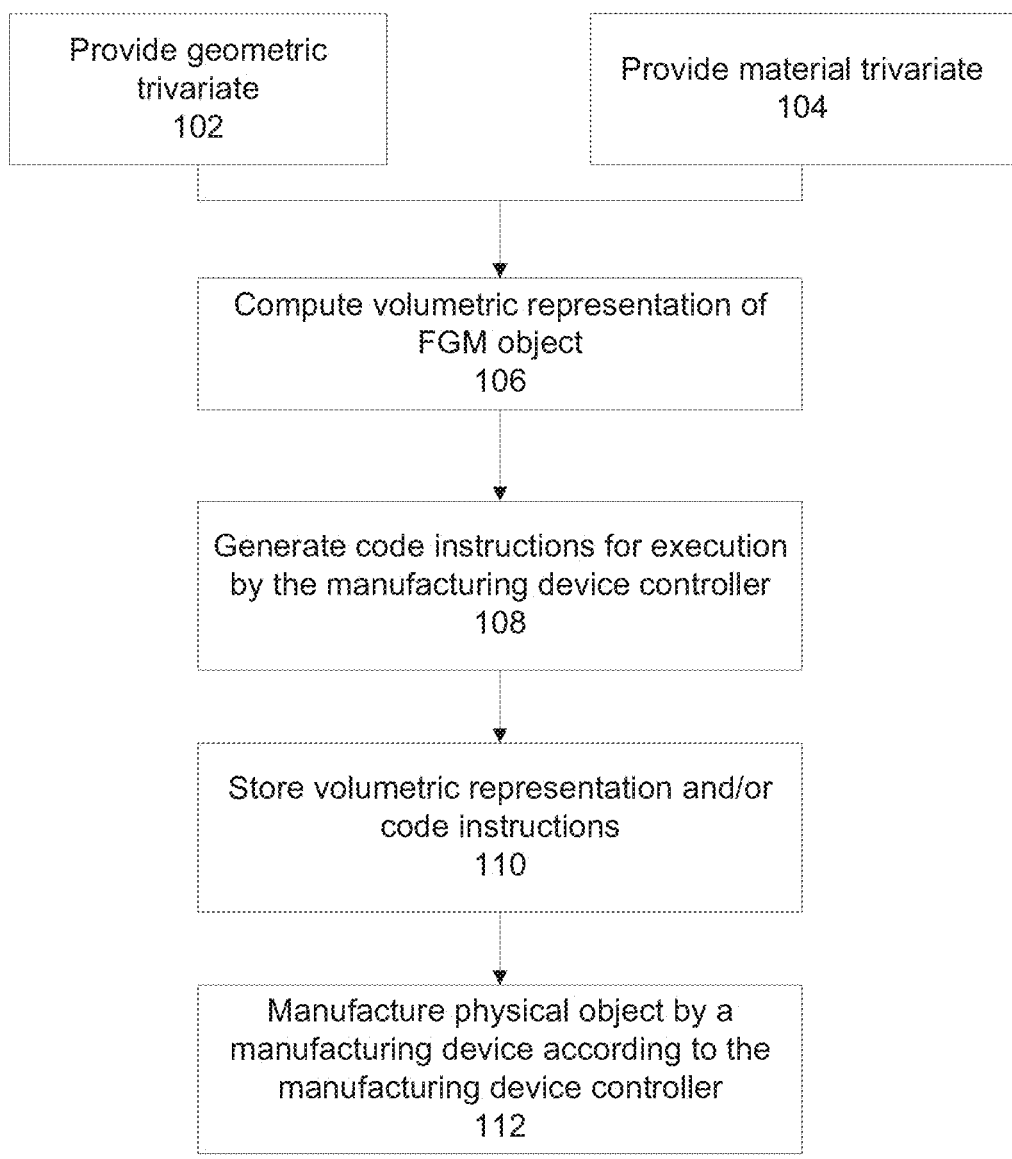
FIG. 1 is a flowchart of a process for generating instructions for manufacturing of an FGM object, in accordance with some embodiments of the present invention.

The present invention, in some embodiments thereof, relates to object representations and, more specifically, but not exclusively, to object representations for manufacturing.

An aspect of some embodiments of the present invention relates to systems, methods, an apparatus, and/or code instructions (stored in a data storage device, executable by one or more hardware processors) for generating instructions for manufacturing of a functionally graded material (FGM) object. Geometric trivariate(s) defining geometry of the FGM object, and material trivariate(s) defining one or more material properties of the FGM object are provided. A volumetric representation of the FGM object is computed that includes the geometric trivariate(s) and the material trivariate(s) spanning a same parametric domain. The volumetric representation of the FGM object may include only the geometric trivariate(s) and the material trivariate(s) that span the same parametric domain. Code instructions for execution by a manufacturing device controller of a manufacturing device for manufacturing of the FGM object are computed by identifying locations (e.g., pixel, voxels) within boundaries defined by the geometric trivariate(s). One or more material values (also referred to herein as material composition, which are indicative of the actual material to be deposited at the corresponding location by the manufacturing device when the instructions are executed) are computed for each identified location according to the material trivariate(s) of the volumetric representation that correspond to the identified locations within the boundaries of the geometric trivariate(s). The identified locations are converted from the parametric domain to Euclidean space. Each of the locations in Euclidean space is associated with a corresponding material composition (i.e., material value(s). The manufacturing device may manufacture the physical version of the FGM object, by depositing material according to the material value(s) at each corresponding location in Euclidean space. Optionally, the manufacturing device is an additive manufacturing (AM) device.

Optionally, the geometric trivariate(s) and/or the material trivariate(s) include (optionally all of the trivariate are) trimmed trivariates.

Optionally, the volumetric representation of the FGM includes a complex of cells, where each respective cell is associated with a set of trimming surfaces that trim the volume of the geometric trivariate(s) and/or the material trivariate(s) corresponding to the respective cell.

At least some of the systems, apparatus, methods, and/or code instructions (i.e., stored in a data storage device executable by hardware processor(s)) described here relate to the technical problem of computing a format for representation of models of FGM objects for manufacturing. In particular, the technical problem relates to computing formats for representation of FGM objects for additive manufacturing At least some of the systems, methods, apparatus, and/or code instructions described herein relate to an improved process for generating a format for representation of an FGM object for manufacturing, optionally by an additive manufacturing device. The volumetric representation format of the FGM object described herein (based on a geometric trivariate(s) and a material trivariate(s) that are defined within a common domain) improves the computational efficiency (e.g., relatively reduced computational resource utilization, reduced computation time, and/or reduced memory requirements) of a computing device that generates instructions for additive manufacturing of a physical form of the FGM object. For example, the material composition (also referred to herein as material value) at any point in the domain of the FGM object and/or the Euclidean space of the representation of the FGM object is computed efficiency, for example, in comparison to voxels which require significant computations resources for computation of all voxels and significant memory size to store the data for all voxels.

In another example, computational efficiency of the computing device is improved by enabling division of the volumetric representation of the FGM object into sub-volumes (e.g., 2D slices), where instructions for manufacturing of each slice are computed by preventing evaluation of the locations falling outside of the sub-volume, which are irrelevant, since such external locations are not printed by the 3D printer. Moreover, each sub-volume may be computed independently of other sub-volumes, which enables parallel processing of the sub-volumes of the FGM object. Memory and/or computational resource utilization (e.g., processor(s) and/or processing time, are relatively lower in comparison to other methods of representing FGM objects for additive manufacturing thereof.

At least some of the systems, methods, apparatus, and/or code instructions described herein are able to represent large FGM objects and/or high resolution FGM objects at a resolution corresponding to the native resolution of the manufacturing device (e.g., 3D printer), which is in contrast to other systems and/or methods that are unable to represent the FGM objects according to the native resolution of the manufacturing device, and/or which are only able to represent the FGM objects according to the native resolution of the manufacturing device by including a large computational cost (e.g., high processor utilization, large amount of memory used, and/or long processing time) in comparison to the systems, methods, apparatus and/or code instructions described herein that are able to represent the FGM objects according to the native resolution of the manufacturing device with computational efficiency.

At least some of the systems, methods, apparatus, and/or code instructions described herein address the technical problem of efficiently embedding objects within the manufactured FGM object (e.g., of a different color and/or material property than the surrounding materials) and/or applying a pattern to the surface of the manufactured FGM object (e.g., of a different color and/or material property than the nearby materials). At least some of the systems, methods, apparatus, and/or code instructions described improve the computational efficiency of the computing device described herein. The computing device computes instructions for execution by the manufacturing device for manufacturing an FGM object which may have embedded objects therein and/or having a pattern thereon, as described herein. The solution to the technical problem, which improves the computational efficiency of the computing device, is based on relating material parameters defined by the material trivariate to geometry defined by the geometry trivariate, according to the common parameterization of the domain common to the geometrical trivariate and the material trivariate. It is noted that other methods that do not use such as shared parameterization based on a common domain, such as voxels and/or B-rep representation, applying a volumetric texture that would follow the geometry (i.e., within the volume and/or on the surface of the object) is much more difficult to control and computationally complex, incurring higher computational costs (e.g., in terms of higher processor utilization, longer processing time, and/or increased memory usage).

At least some of the systems, methods, apparatus, and/or code instructions described herein provide technical solutions to technical problems that are not solved by other systems and/or methods, and/or provide an improvement to the technology of representing FGM objects for manufacturing thereof and/or manufacturing FGM objects, optionally AM, as described below.

At least some of the systems, methods, apparatus, and/or code instructions described herein provide an improvement over other systems and/or methods, for example, contemporary freeform modeling tools, which are based on boundary representations (B-rep) of 3D objects. Such boundary representations described only the outlines and/or surface of the 3D object. B-reps are incapable of supporting FGM objects without introducing additional information to describe the internal structure of the model, which increases computational costs of such representation. In contrast, the systems, methods, apparatus, and/or code instructions described herein provide a single data structure for representing both the geometry and the material properties at any point within the FGM object.

At least some of the systems, methods, apparatus, and/or code instructions described herein provide an improvement over other systems and/or methods in terms of computing a representation for FGM objects. There have been many different strategies proposed for the specification, design, and manufacturing of FGM objects, with no single strategy emerging as dominant. Indeed, while there is some standardization effort in the representation of objects made from several materials, such as the AMF standard described with reference to *ISO ASTM. Astm*52915-13, *standard specification for additive manufacturing file format (amf) version* 1.1. *ASTM International, West Conshohocken, Pa.,* 52915:2013, 2013 that can support a discrete number of volumes filled by a discrete number of materials, there is still no clearly accepted way to represent FGM objects. A more thorough (but not very recent) review is described with reference to X Y Kou and ST Tan. *Heterogeneous object modeling: A review. Computer-Aided Design,* 39(4):284-301, 2007.

Some examples of previous systems and methods for representing FGM objects are now described, the shortcomings of which are addressed by at least some of the systems, methods, apparatus, and/or code instructions described herein. None of the other systems and methods offer direct slicing of a trimmed trivariate representation of the FGM object model. In contrast, at least some of the systems, methods, apparatus, and/or code instructions described herein enable slicing of a trimmed trivariate representation of the FGM object model. Supporting trimmed trivariates, as described herein, provides the capability to capture the space of (e.g., all) B-rep models, as volumetric functions suitable for FGM design.

For example, Voxels are perhaps the most straightforward way of representing an FGM object. Voxels fit well with the sort of input some 3D printers expect, like the input described with reference to E L Doubrovski, E Y Tsai, D Dikovsky, J M P Geraedts, Hugh Herr, and Neri Oxman. *Voxel-based fabrication through material property mapping: A design method for bitmap printing. Computer-Aided Design,* 60:3-13, 2015. However, memory and computational requirements make the implementation of Voxels problematic to use for large objects when a high resolution is needed (e.g. as described with reference to X Y Kou and ST Tan. *Heterogeneous object modeling: A review. Computer-Aided Design,* 39(4):284-301, 2007), or for other needs such as design and analysis. It is noted that approaches such as described with reference to Ken Museth. *Vdb: High-resolution sparse volumes with dynamic topology. ACM Transactions on Graphics (TOG),* 32(3):27, 2013, may alleviate some of these deficiencies by using a sparse hierarchical representation rather than a full grid to represent a collection of voxels. An example of a system that uses voxels for modeling is described by Panagiotis Michalatos and Andrew O. Payne. *Project monolith. http://www(dot)monolith(dot)zone/,* 2017. In contrast, at least some of the systems, methods, apparatus, and/or code instructions described herein, which are based on trivariate representations of FGM objects, have lower memory and/or computational requirements in comparison to using voxels, and/or are able to represent large objects and/or high resolution objects.

In another example, FGM objects are modeled in a piecewise linear volume mesh. For example, as described with reference to T R Jackson, H Liu, N M Patrikalakis, E M Sachs, and M J Cima. *Modeling and designing functionally graded material components for fabrication with local composition control. Materials & Design,* 20(2):63-75, 1999, FGM objects are modeled by subdividing the FGM objects into simple cells (i.e., finite element meshes), with material properties defined analytically within each cell. Objects are subdivided into tetrahedral meshes, of limited continuity. The method is somewhat reminiscent of a tessellation operation adapted to volumes, which is a different approach than that described herein based on trivariates.

In another example, Kiril Vidimce, Szu-Po Wang, Jonathan Ragan-Kelley, and Wojciech Matusik. *Openfab: a programmable pipeline for multi-material fabrication. ACM Transactions on Graphics (TOG),* 32(4):136, 2013 relates to an architecture that is inspired by the rendering pipeline commonly used in computer graphics hardware. The input used is a polygonal mesh, and programmable shaders (i.e., short programs called fablets) are used to specify the material properties. The focus appears to be on producing a generic architecture and an FGM representation that can be efficiently converted to AM instructions using the described fablet architecture. The described implementation, however, requires the design stage (and the designers) to produce models that include program code for the aforementioned fablets which may not be convenient. Additionally, if the material specification is produced by an automated analysis process, the conversion to fablet code may not always be feasible. In contrast, at least some of the systems, methods, apparatus, and/or code instructions described herein provide a generic data structure for storing the volumetric representation of the FGM object, where the generic data structure may be processed for manufacturing the FGM object by a wide range of different additive manufacturing devices.

In another example, an FGM object is modeled in a constructive procedural manner. To evaluate the material properties at any point, a program that determines the material composition at that point is executed. As described with reference to Desai Chen, David I W Levin, Piotr Didyk, Pitchaya Sitthi-Amorn, and Wojciech Matusik. *Spec2fab:a reducer-tuner model for translating specifications to 3d prints. ACM Transactions on Graphics (TOG),* 32(4):135, 2013, this program takes the form of a "reducer-tuner model", a construct that creates the required program based on design goals. In another example, as described with reference to Christoph Bader, Dominik Kolb, James C Weaver, and Neri Oxman. *Data-driven material modeling with functional advection for 3d printing of materially heterogeneous objects. 3D Printing and Additive Manufacturing,* 3(2):71-79, 2016, external and user-generated data sets are used to evaluate material distributions. In contrast, at least some of the systems, methods, apparatus, and/or code instructions described herein that are based on trivariates for representation of the FGM object enable computationally efficient (e.g., relatively reduced computational resource utilization, reduced computation time, and/or reduced memory requirements) determination of the material composition at any point in the domain of the FGM object and/or the Euclidean space of the representation of the FGM object.

In another example, Ki-Hoon Shin and Debasish Dutta. *Constructive representation of heterogeneous objects. Journal of Computing and Information Science in Engineering,* 1(3):205-217, 2001 relates to representation of the material composition of an FGM object at a point (x, y, z) by an explicit function $f(x, y, z)$. Although the representation may appear to provide an evaluation of the material properties at any point, the evaluation process is difficult (e.g., costly in terms of computational resource utilization, high computation time, and/or high memory utilization) to relate to an object with a complex geometry since an arbitrary coordinate system is used. Other efforts, such as described with reference to X Y Kou and ST Tan. *A hierarchical representation for heterogeneous object modeling. Computer-Aided Design,* 37(3):307-319, 2005, attempt to parameterize the object according to distances from "material features". Using material features, the material properties at any point are determined as a function of the distance to the features. In contrast, at least some of the systems, methods, apparatus, and/or code instructions described herein that are based on trivariates for representation of the FGM object enable computationally efficient (e.g., relatively reduced computational resource utilization, reduced computation time, and/or reduced memory requirements) determination of the material composition at any point in the domain of the FGM object and/or the Euclidean space of the representation of the FGM object.

In another example, parametric volumes (as discussed above) are used toward the modeling of FGM objects. In such representations, FGM objects are modeled as extensions of parametric curves and surfaces by adding a third, volumetric, degree of freedom and additional material information to the control points of these entities. For example, as described with reference to Xiaoping Qian and Debasish Dutta. *Feature-based design for heterogeneous objects. Computer-AidedDesign*, 36(12):1263-1278, 2004, this is done by specifying control points for the trivariate as: $P_{ijk}=(\ddot{x}_{ijk}, M_{ijk})$. In this case, $\ddot{x}_{ijk}$ denote positions, and the values of $M_{ijk}$ denote any additional material information needed. $M_{ijk}$ is usually a vector, that has the same number of coordinates as the number of available materials, with each element in the vector representing the volume fraction (out of 1) of a single material. In another example, Yuhi Sasaki, Masahito Takezawa, Seungki Kim, Hiroshi Kawaharada, and Takashi Maekawa. *Adaptive direct slicing of volumetric attribute data represented by trivariate b-spline functions. The International Journal of Advanced Manufacturing Technology*, pages 1-17, 2016 appears to relate to a method for directly slicing trivariate volumes. Material information is represented by a B-spline trivariate function (just like the geometry), and is produced by fitting the function to a given set of points that assign material properties to spatial coordinates. Some adaptations needed to sample material information for printing techniques that require relatively slow changes in material composition (relative to changes in position) are presented. However, the methods described with reference to Yuhi Sasaki, Masahito Takezawa, Seungki Kim, Hiroshi Kawaharada, and Takashi Maekawa. *Adaptive direct slicing of volumetric attribute data represented by trivariate b-spline functions. The International Journal of Advanced Manufacturing Technology*, pages 1-17, 2016 are only applied to low printing resolutions (tens of thousands of sampled points), and may not scale well to producing the billions of sample points required to work with the native resolution of modern FGM printers. In contrast, at least some of the systems, methods, apparatus, and/or code instructions described herein that are based on trivariates for representation of the FGM object scale to provide a very large number of sample points (e.g., on the order of billions) according to the native resolution of FGM manufacturing devices, such as 3D printers.

When the features related to by the systems, methods, apparatus, and/or code instructions described herein are taken as a whole, the combination of the features amounts to significantly more than a simple mathematical calculation of a representation of an FGM object. The systems, methods, apparatus, and/or code instructions described herein do not merely relate to mathematical computations, but relate to the particular way in which the FGM object is represented for increasing computational efficiency of a computing device that computes instructions for additive manufacturing of the FGM object, and relate to computation of the instructions for additive manufacturing of the FGM object based on the volumetric representation.

At least some of the systems, methods, apparatus, and/or code instructions described herein improve an underling technical process within the technical field of manufacturing FGM objects, optionally additive manufacturing of FGM objects.

Accordingly, the systems and/or methods described herein are inextricably tied to computer technology and manufacturing technology, optionally additive manufacturing technology (e.g., 3D printing technology) to overcome an actual technical problem arising in manufacturing of geometric objects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms additive manufacturing and 3D printing may sometimes be interchanged.

As used herein, the terms model and representation may sometimes be interchanged.

As used herein, the terms material composition and material value (or value) are sometime interchangeable. The material composition and/or material value is indicative of the actual material to be deposited at the corresponding location by the manufacturing device when the instructions are executed.

Figure 2:
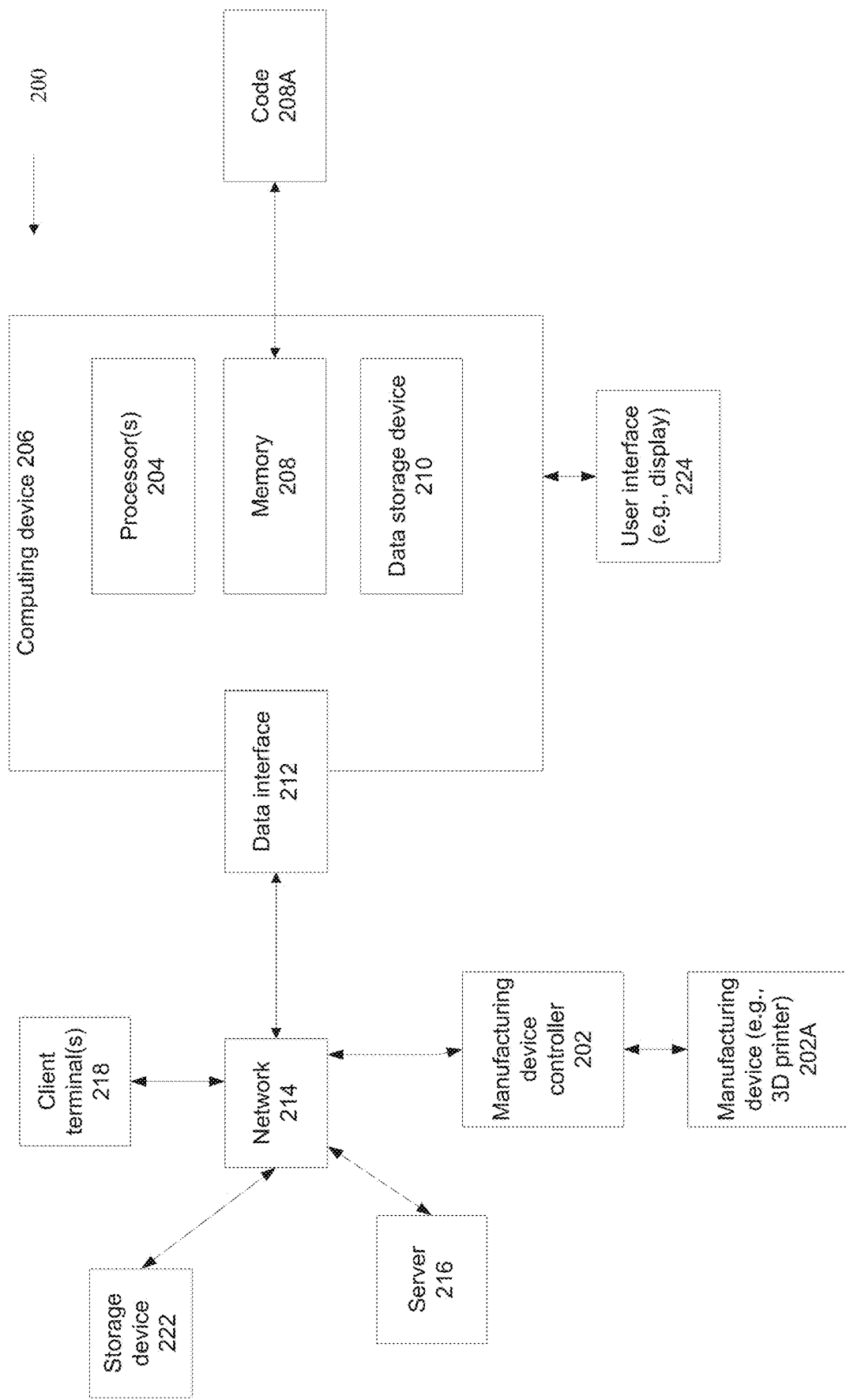
FIG. 2 is a block diagram of a system for generating instructions for manufacturing of an FGM object, in accordance with some embodiments of the present invention.

Reference is now made to FIG. 1, which is a flowchart of a process for generating instructions for manufacturing of an FGM object, in accordance with some embodiments of the present invention. Reference is also made to FIG. 2, which is a block diagram of a system 200 for manufacturing of an FGM object, in accordance with some embodiments of the present invention. System 200 may generate code instructions according to the object representation, that when executed by a manufacturing device controller 202 cause a manufacturing device 202A to manufacture the FGM object according to the representation. System 200 may execute the acts of the method described with reference to FIG. 1, for example, by a hardware processor(s) 204 of a computing device 206 executing code 208A stored in a memory 208.

Manufacturing device 202A is designed to manufacturing FGM objects.

Manufacturing device 202A may be implemented as, for example, an additive manufacturing device for additive manufacturing of the representation of the object, a 3D printer for 3D printing of the representation of the object.

Alternatively or additionally, manufacturing device 202A may be implemented based on powder printing. For example, as described with reference to Pierre Muller, Pascal Mognol, and Jean-Yves Hascoet. *Modeling and control of a direct laser powder deposition process for functionally graded materials (fgm) parts manufacturing. journal of materials processing technology,* 213(5):685-692, 2013 where the mixing of metallic powders in different proportions is discussed. In another example, printed examples described with reference to X Y Kou and ST Tan. *A hierarchical representation for heterogeneous object modeling. Computer-Aided Design,* 37(3):307-319, 2005 show results created using a Z Corporation's (powder based) 3D printer by using binders of different colors, claiming to simulate material grading.

Alternatively or additionally, manufacturing device 202A may be implemented based on a fused deposition modeling (FDM) printer designs that incorporates the ability to use multiple materials, by mixing filaments (in a dedicated mixing chamber) to dynamically change the extrusion material, for example, as described with reference to J. S. Page. Material dispensing system, Apr. 2, 2015. U.S. patent application Ser. No. 14/501,896. Another approach suggests mixing the filaments outside the printer, then using the mixed filament in a standard FDM printer, for example, as described with reference to Mosaic Manufacturing Ltd. *Series enabled extrusion of materials. https://www(dot)mosaicmanufacturing(dot)com/pages/technology,* 2016.

Alternatively or additionally, manufacturing device 202A may be implemented as, one or more of: a bioprinter for bioprinting of the FGM object, a 3D electronic structure, a fabrication machine for fabrication of the FGM object, a manufacturing device that manufactures parts for assembly by another device and/or parts that self-assembly. The manufacturing device may implement different manufacturing methods, for example, any combination of the aforementioned.

Manufacturing device controller 202 may be implemented as, for example, a hardware processor(s) integrated within manufacturing device 202A, and/or an external computing device in communication with manufacturing device 202A.

Computing device 206 may be implemented as, for example, a client terminal, a virtual machine, a server, a virtual server, a computing cloud, a mobile device, a desktop computer, a thin client, a kiosk, and a mobile device (e.g., a Smartphone, a Tablet computer, a laptop computer, a wearable computer, glasses computer, and a watch computer).

Multiple architectures of system 200 based on computing device 206 may be implemented. For example:

- Computing unit 206 may be integrated with the manufacturing device (i.e., controlled by controller 202), for example, as a control console and/or control unit and/or instructions code stored within manufacturing device 202A for execution by a hardware processor(s) of the manufacturing device.
- Computing device 206 may be implemented as a stand-alone device (e.g., kiosk, client terminal, smartphone) that include locally stored code instructions 208A that implement one or more of the acts described with reference to FIG. 1. Computing device 206 is external to manufacturing device 202A, and communicates with manufacturing device 202A, for example, over a network, and/or by storing instructions on a data storage device that is then accessed by the controller. The locally stored instructions may be obtained from another server, for example, by downloading the code over the network, and/or loading the code from a portable storage device.
- Computing device 206 executing stored code instructions 208A, may be implemented as one or more servers (e.g., network server, web server, a computing cloud, a virtual server) that provides services (e.g., one or more of the acts described with reference to FIG. 1 to one or more client terminals 218 over a network 214. For example, providing software as a service (SaaS) to the client terminal(s) 218, providing software services accessible using a software interface (e.g., application programming interface (API), software development kit (SDK)), providing an application for local download to the client terminal(s) 218, providing an add-on to a web browser running on client terminal(s) 218, and/or providing functions using a remote access session to the client terminals 218, such as through a web browser executed by client terminal 218 accessing a web sited hosted by computing device 206.
- Code 208A may be designed as an add-on to modeling, simulation, and/or analysis applications, for example, as a tool-bar, library, script, and/or additional menu features. For example, a commercial available simulation application may integrate code 208A to create the representation of the object (as described herein), which then undergoes simulation by the commercially available simulation application. In another example, a commercially available analysis application may integrate code 208A to design the representation of the object (as described herein), which then undergoes analysis and optionally manufacturing by the commercially available analysis application.

Hardware processor(s) 204 of computing device 206 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 204 may include a single processor, or multiple processors (homogenous or heterogeneous) arranged for parallel processing, as clusters and/or as one or more multi core processing devices.

Memory 208 stores code instructions executable by hardware processor(s) 204, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 208 stores code 208A that implements one or more features and/or acts of the method described with reference to FIG. 1 when executed by hardware processor(s) 202.

Computing device 206 may include a data storage device 210 for storing data, for example, an application for use by a user to design the geometric object, and/or a repository that stores the created object representation (s), and/or a repository that stores the generated instructions for execution by the manufacturing controller for manufacturing the representation of the object. Data storage device 210 may be implemented as, for example, a memory, a local hard-drive, a removable storage unit, an optical disk, a storage device, and/or as a remote server and/or computing cloud (e.g., accessed using a network connection). It is noted that code instructions 208A may be stored in data repository 210, for example, with executing portions loaded into memory 208 for execution by processor(s) 204.

Computing unit 206 may include a data interface 212, optionally a network interface, for connecting to network 214, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing unit 206 may access one or more remote servers 216 and/or data storage device(s) 222 using network 214, for example, to obtain the geometric trivariates and/or the material trivariates of the FGM object, and/or to provide the generated representation of the FGM object and/or to provide the generate instructions for manufacturing of the FGM object.

Network 214 may be implemented as, for example, the internet, a local area network, a virtual network, a wireless network, a cellular network, a local bus, a point to point link (e.g., wired), and/or combinations of the aforementioned.

Computing device 206 may connect using network 214 (or another communication channel, such as through a direct link (e.g., cable, wireless) and/or indirect link (e.g., via an intermediary computing unit such as a server, and/or via a storage device) with one or more of:

- Client terminal(s) 218, for example, when computing unit 206 acts as a server providing services to the client terminals.
- An external manufacturing device controller 202 that controls manufacturing device 202A that manufactures the object according to instructions based on the representation of the object.
- A storage device 222 that stores the geometric trivariate and/or material trivariate and/or volumetric representation of the FGM object and/or code instructions for manufacturing of the FGM object (e.g., provided by client terminal 218, server 216, and/or used by computing device 206 for remote storage) and/or the generated representation of the object and/or the generated code instructions for manufacturing of the object according to the representation. Storage device 222 may include, for example, a storage server, a computing cloud storage server, or other implementations.

Server(s) 216 that may act as client terminals accessing computing device 206 for remote services, and/or data storage server(s) that store the geometric trivariate and/or material trivariate and/or volumetric representation of the FGM object and/or code instructions for manufacturing of the FGM object.

Computing unit 206 includes or is in communication with a user interface 224 allowing a user to enter data and/or view presented data. Exemplary user interfaces 224 include, for example, one or more of, a touchscreen, a display, a keyboard, a mouse, and voice activated software using speakers and microphone.

Computing device 206 includes and/or is in communication with one or more physical user interfaces 224 that include a mechanism for a user to enter data (e.g., define the geometry of the FGM object and/or the material properties of the FGM object) and/or view the displayed results (e.g., the created representation of the object). Exemplary user interfaces 224 include, for example, one or more of, a touchscreen, a display, gesture activation devices, a keyboard, a mouse, and voice activated software using speakers and microphone. The user interface may present a graphical user interface (GUI) for entering the data and/or viewing the displayed results.

Referring now back to FIG. 1, at 102, geometric trivariate(s) defining geometry of the FGM object are provided. The geometric trivariate(s) may be provided, for example, by a user designing the FGM object using an application (e.g., GUI) that outputs geometric trivariate(s) representations of the FGM object, obtained from a data storage device (e.g., file stored in a memory), obtained from another computing device (e.g., downloaded from a remote server over the network), and/or converted from another format representation of the geometric trivariate(s) (e.g., voxels) by conversion code.

At 104, material trivariate(s) defining one or more material properties of the FGM object are provided. Material properties may include, for example, type of material, color, density, and stiffness.

The material trivariate(s) may be provided, for example, by a user designing material properties of the FGM object using an application (e.g., GUI) that outputs material trivariate(s) for the designed FGM object, obtained from a data storage device (e.g., file stored in a memory), obtained from another computing device (e.g., downloaded from a remote server over the network), and/or converted from another format representation of the material properties by conversion code.

The material trivariate(s) may be defined as any function. The flexibility in implementation of the material trivariate(s) allows the designers the freedom to use whatever is appropriate for their respective designs. Exemplary material trivariate(s) are according to, for example: a refinement of a spline space of the geometric trivariate(s), a procedural function for example as described with reference to Kiril Vidimce, Szu-Po Wang, Jonathan Ragan-Kelley, and Wojciech Matusik. *Openfab: a programmable pipeline for multi-material fabrication. ACM Transactions on Graphics (TOG)*, 32(4):136, 2013, a single function per cell of the volumetric representation of the FGM object, according to analysis results (e.g., based on an application that analyzes the geometric trivariate(s) such as simulates stress), according to material features, according to available materials, and according to possible options defined by the hardware of the manufacturing device.

Optionally, the material trivariate(s) is represented as a three variable function over the parametric domain of the volumetric representation of the FGM object.

The features of 102 and 104 may be provided simultaneously, for example, outputted by the application that enables a user to design the FGM object. The features of 102 and 104 may be provided independently of one another, for example, from two independent sources. The order of 102 and 104 may vary, for example, 102 may be provided before 104, or 104 may be provided before 102.

The geometric trivariate(s) and/or the material trivariate(s) are now discussed together.

The geometric and/or material trivariate(s) may be based on, for example, volumetric representations (V-rep) frameworks that that supports the same general modeling space as B-rep modeling tools, but use volumetric trivariates, for example, as described with reference to Bing-Quan Zuo, Zheng-Dong Huang, Yan-Wei Wang, and Zi-Jun Wu. *Isogeometric analysis for csg models. Computer Methods in Applied Mechanics and Engineering*, 285:102-124, 2015 and Fady Massarwi and Gershon Elber. *A b-spline based framework for volumetric object modeling. Computer-Aided Design*, 78:36-47, 2016. SPM 2016. V-reps are compact and as described herein, are used to represent both complex geometry and material composition. V-reps conceptually capture the generality of B-reps for geometric design, while providing a simple integration path with the design and analysis processes of FGM objects.

Optionally, the geometric trivariate(s) and/or the material trivariate(s) include (optionally all of the trivariate are) freeform trivariates.

Optionally, the geometric trivariate(s) and/or the material trivariate(s) include (optionally all of the trivariate are) continuous functions, which are optionally trimmed as described herein.

Optionally, the geometric trivariate(s) and/or the material trivariate(s) include (optionally all of the trivariate are) three dimensional (3D) functions.

Optionally, the geometric trivariate(s) and/or the material trivariate(s) include (optionally all of the trivariate are) trimmed trivariates. Optionally, the volumetric representation of the FGM includes a complex of cells, where each respective cell is associated with a set of trimming surfaces that trim the volume of the geometric trivariate(s) and/or the material trivariate(s) corresponding to the respective cell.

Optionally, cells (e.g., each cell) of the complex of cells includes a single parameterization of the geometric trivariate(s) and/or the one material trivariate(s).

Optionally, cells (e.g., each cell) of the complex of cells includes control points and/or blending functions for the geometric trivariate(s) and/or the material trivariate(s) corresponding to the respective cell.

Optionally, trivariate(s) (e.g., each trivariate) of geometric trivariate(s) and/or the material trivariate(s) are regular with a non-vanishing Jacobian and/or without global self intersections.

Optionally, the geometric trivariate(s) is independent of the material trivariate(s) and/or the material trivariate(s) is independent of the geometric trivariate(s).

Optionally, the geometric trivariate(s) and/or the material trivariate(s) include parametric volumetric trivariate(s).

At 106, a volumetric representation of the FGM object is computed based on the geometric trivariate(s) and the material trivariate(s). The volumetric representation may be computed by mapping the geometric trivariate(s) and the material trivariate(s) to the same domain, or by mapping the material trivariate(s) to the domain of the geometric trivariate(s), or by mapping the geometric trivariate(s) to the domain of the material trivariate(s).

Optionally, a single volumetric representation of the FGM object is computed based on the geometric trivariate(s) and the material trivariate(s).

Optionally, a definition of one or more volume regions where no material is present is added to the volumetric representation of the FGM object, for computing a porous texture of the FGM object. For example, the volume regions defined according to the domain of the geometric trivariate(s) is added via a Boolean operation to the geometric trivariate(s) to create the porous texture.

Optionally, the FGM object, mathematically denoted as $FGM_{obj}$, is represented as a cell complex of (optionally trimmed) trivariate parametric functions. The trivariate may be modeled, for example, as described with reference to Fady Massarwi and Gershon Elber. *A b-spline based framework for volumetric object modeling. Computer-Aided Design*, 78:36-47, 2016. SPM 2016 by common authors of the present application, and/or based on other methods. Each trivariate may be assumed regular (i.e., with a non-vanishing Jacobian), and/or without global self intersections. The cells in the FGM object are mathematically denoted as $FGM_{cell}$. The cells in the FGM object may correspond to the cells of a V-rep as described with reference to Fady Massarwi and Gershon Elber. *A b-spline based framework for volumetric object modeling. Computer-Aided Design*, 78:36-47, 2016. SPM 2016. However, in contrast to the cells in Fady Massarwi and Gershon Elber. *A b-spline based framework for volumetric object modeling. Computer-Aided Design*, 78:36-47, 2016. SPM 2016, optionally only a single parameterization may be implemented for each cell. The single parameterization avoids ambiguities.

The cells of the FGM object may be mathematically denoted as:

$$FGM_{cell}(u,v,w)=\{V(u,v,w),M(u,v,w),S\}$$

where:

V(u,v,w) denotes the geometrical trivariate,

M(u,v,w) denotes the material trivariate that defines the material parameters (e.g., material composition). M(u,v,w) spans the same (u,v,w) domain as V(u,v,w). M(u,v,w) may be independent of V(u,v,w).

S denotes the set of trimming surfaces that trim the (optionally cuboid topology of the) volume of V(u,v,w) and define the boundaries of the FGM object cell, and $$V(u, v, w) = (v_x(u, v, w), v_y(u, v, w), v_z(u, v, w)) = \sum_{i=0}^{n_u}\sum_{j=0}^{n_v}\sum_{k=0}^{n_w} P_{ijk}B_i(u)B_j(v)B_k(w)$$

Where:

$$P_{ijk}=(x_{ijk},y_{ijk},z_{ijk})$$

$B_i(u)$, $B_j(v)$, $B_k(w)$ denote control points and/or blending functions of the trivariate volume.

Optionally, the volumetric representation of the FGM object is further processed by applying different textures, such as procedural and/or discrete textures may be applied (e.g., as shown in the Figures of the fabricated FGM objects). Other processing may be performed, for example, using tools such as iso-geometric analysis, for example, as described with reference to J Austin Cottrell, Thomas J R Hughes, and Yuri Bazilevs. *Isogeometric analysis: toward integration of CAD and FEA*. John Wiley & Sons, 2009.

At 108, code instructions are computed, for execution by the manufacturing device controller of the manufacturing device for manufacturing of the FGM object according to the volumetric representation of the FGM object and optionally according to the input format of the manufacturing device.

Locations (e.g., pixel, voxels) within boundaries defined by the geometric trivariate(s) are identified. One or more material values (also referred to herein as material composition, which are indicative of the actual material to be deposited at the corresponding location by the manufacturing device when the instructions are executed) are computed for each identified location according to the material trivariate(s) of the volumetric representation that correspond to the identified locations within the boundaries of the geometric trivariate(s). The identified locations are converted from the parametric domain to Euclidean space. Each of the locations in Euclidean space is associated with a corresponding material composition (i.e., material value(s)). The code instructions are created based on the locations in Euclidean space associated with corresponding material composition.

Optionally, the volumetric representation of the FGM object is divided into multiple sub-volumes, for example, slices. Optionally, each sub-volume is represented as a two dimensional (2D) area, for example, a 2D slice. In such 2D representation, the x and y dimensions may be defined. The z dimension may be ignored when processing the 2D slice and/or the z dimension may be assigned a predefined value, since the z dimension may be defined to be of a fixed and uniform sized according to the resolution capabilities of the manufacturing device. The dimensions of the sub-volumes may be determined according to hardware manufacturing capabilities of the manufacturing device, for example, corresponding to the printing resolution of the 3D printer.

As used herein, the term sub-volume may refer to a 3D sub-volume or a 2D sub-volume, for example, a 3D slice and/or 2D slice.

Standard AM approaches to slicing are described, for example, with reference to Pulak Mohan Pandey, N Venkata Reddy, and Sanjay G Dhande. *Slicing procedures in layered manufacturing: a review. Rapid prototyping journal*, 9(5): 274-288, 2003. However, in contrast to standard approaches, each of the sub-volumes is filled according to values of the material trivariate(s) that corresponding to the domain locations of the geometric trivariate(s). For example, the sub-volumes are filled with pixel values, where each distinct pixel values denotes a distinct material.

The volumetric representation of the FGM object is divided according to the boundaries of the trimming surfaces (denoted S), also referred to as 'slicing'. The division may be performed by intersecting the volumetric representation of the FGM object with a plane (e.g., at a given height denoted z), to create an outline of a respective sub-volume (e.g., slice). The sub-volume (e.g., slice) is filled with data indicative of material properties according to a format read by the manufacturing device for manufacturing the respective sub-volume of the FGM object. The material data for each sub-volume may be stored a set of bitmaps that encode the material properties for each location (e.g., point, pixel, voxel) within the respective sub-volume.

It is noted that evaluating and specifying the material properties for each location (e.g., point, pixel, voxel) inside the voxel is computationally expensive (e.g., in terms of relatively high processor utilization, long processing time, and/or large memory usage). When dividing the FGM object into sub-volumes, the position of a certain location is available in Euclidean space. However, the material trivariate(s) is a function of the parametric domain (u, v, w), which is different than the Euclidean space.

As discussed herein, the geometric trivariate(s) and the material trivariates(s) of each FGM cell of the FGM object are functions over the same parametric domain. Given a location in the parametric domain (u, v, w), retrieving the Euclidean position $V(u, v, w)=(x, y, z)$, and the material parameters $M(u, v, w)$ for that parametric location is computationally simple, amounting to an evaluation of V and Mat (u, v, w). However, given a point in Euclidean space, (x, y, z), it is more difficult to determine its material composition, since an inverse problem is solved to retrieve the parametric values for the point in Euclidean space (assuming definitions are available). In terms of mathematical representation, given a Euclidean point (x, y, z), the following is a system of three (often non-linear piecewise polynomial) constraints and three unknown (u, v, w) denoting a classical inverse problem (also referred to as system of constraints): $x=v_x(u, v, w)$, $y=v_y(u, v, w)$, $z=v_z(u, v, w)$. $v_x(u, v, w)$, $v_y(u, v, w)$, and $v_z(u, v, w)$ have been defined above. By solving the system of constraints, the (u, v, w) values for a certain Euclidean point (x, y, z) is obtained. The system of constraints may be solved, for example, as described with reference to Iddo Hanniel and Gershon Elber. *Subdivision termination criteria in subdivision multivariate solvers using dual hyperplanes representations. Computer-Aided Design*, 39(5):369-378, 2007. However, evaluating the system of constraints is solved millions or even billions of times, once for each location (e.g., point, pixel, voxel) of the FGM object, which is computationally inefficient and/or computationally expensive.

The computationally inefficient and/or computationally expensive evaluation of the parameter values for a certain Euclidean location (x, y, z) of the FGM object may be improved, for example, based on the following mathematical observation, denoted Lemma 1: The solution for the system of constraints, $(u_0, v_0, w_0)$, exists and is unique for every point $(x_0, y_0, y_0)$ inside a self intersection free and regular volume V(u, v, w). The proof of the uniqueness of the solutions to the system of constraints follows directly from the assumption of V(u, v, w) being regular and without (global) self intersections.

Optionally, an improvement in computational efficiency may be obtained by computing the multiple sub-volumes in parallel, for example by a parallel processing system of multiple connected nodes, and/or by a parallel processor having multiple processing cores. Computation of a certain sub-volume is independent of computation of another sub-volume.

Optionally, a material composition of a certain location in Euclidean space is computed based on parametric locations of the material trivariate(s) corresponding to the certain location in Euclidean space. Once the value (u, v, w) for a certain location (x, y, z) is computed, the material properties at the certain location may be calculated by evaluation the value of the material trivariate(s) M(u, v, w).

Optionally, sample locations of the geometrical trivariate(s) are sampled to determine whether each respective sample location falls within outlines of the respective sub-volume (or falls outside the respective sub-volume). The outline of the current sub-volume is used to classify whether points fall inside the volumetric representation of the FGM (i.e., within the current slice), or outside the volumetric representation of the FGM (i.e., external to the current slice). The material composition is computed for the respective sample location(s) that fall within outlines of the respective sub-volume. Sample locations falling outside of the outlines of the respective sub-volume may be ignored. Computational efficiency of the computing device is improved by preventing evaluation of the locations falling outside of the sub-volume, which are irrelevant, since such external locations are not printed by the printer.

The sampling of the sample locations may be performed, for example, along straight lines (optionally aligned to the x and/or y axis), and/or performed as flood-fill (i.e. James D Foley, Andries Van Dam, et al. *Fundamentals of interactive computer graphics, volume* 2. Addison-Wesley Reading, M A, 1982). Sampling along straight lines may be performed based on a rasterization process of sampling straights lines aligned to the x or y axis, for example, based on scan conversion process used in computer graphics, for example, as described with reference to James D Foley, Andries Van Dam, et al. *Fundamentals of interactive computer graphics, volume* 2. Addison-Wesley Reading, M A, 1982. It is noted that the representation of the FGM object described herein is designed for manufacturing, and therefore is different than the computer graphics described with reference to James D Foley, Andries Van Dam, et al. *Fundamentals of interactive computer graphics, volume* 2. Addison-Wesley Reading, Mass., 1982 that are simply displayed on a screen.

Optionally, a full solution (e.g., computed by the full solver code) is computed for a certain location within the outlines of the respective sub-volume. Multiple solutions for multiple other close-by locations located in proximity to the certain location are computed based on the full solution computed for the certain location. For example, based on a numeric tracing code that iteratively uses a previous solution of another location in proximity to the certain location as an initial guess of the solution of the certain location, and drawing upon the uniqueness of the solution.

An exemplary process for determining if each respective location (e.g., point, pixel, voxel) is located inside or outside the outline of the respective sub-volume is now described. The intersections between the outline of the respective sub-volume and the sampling line(s) is computed. Since the lines are axis aligned, the process is computationally efficient. In terms of mathematical representation, given a set of y-axis aligned lines, denoted L, at x positions denoted $x_i$, i=1, . . . , $N_L$, and the outline curve denoted $O(t)=(o_x(t), o_y(t))$, the t values at the intersections denote the solutions to the relationship $o_x(t)=x_i$. When the intersections between the outline and the lines is computed, the lines are clipped to the segments inside the outline. Then, pixels and/or voxels (e.g., represented by their center point) are sampled along the internal segments. This described optimization to determine if a sample point (e.g. pixel) is inside or outside the current sub-volume avoids unnecessarily attempting to solve the system of constraints equations (described above) for points outside the current sub-volume, which improves computational efficiency of the computing device.

Once the locations within the respective sub-volume are identified, another optimization for improved computational efficiency may be implemented. As described above with reference to Lemma 1, it is known that a unique solution exists when the Euclidean point is inside (or outside) of the geometric trivariate. Based on Lemma 1, the use of a full solver which is general and aims to find all solutions globally and which is computationally costly (e.g., as described with reference to Iddo Hanniel and Gershon Elber. *Subdivision termination criteria in subdivision multivariate solvers using dual hyperplanes representations. Computer-Aided Design*, 39(5):369-378, 2007) is reduced.

When the full solver is utilized to compute the solution for a single point, the solution for any other close-by point (relative to the single point) may be attempted by employing a numeric tracing (e.g., a Newton iteration method), using the previous solution for the close-by point as an initial guess. Based on Lemma 1, when the numeric tracing converges to a solution, then the computed solution is the only valid solution. When the Newton method fails to converge, the full solver is used to find the solution. In practice, and as discussed in additional detail in the Examples section below, a single invocation of the full solver might be sufficient for a whole area enclosed by one outline. The experimental results described below show that indeed, in practice, the full solver is used very rarely.

In another implementation, the solution for other close-by points may be obtained by using results from a previously computed sub-volume (e.g., layer) located in proximity to the current sub-volume (e.g., layer) as initial values for numeric tracing.

The code instructions may be computed according to the Euclidean locations and associated material value(s).

The code instructions may be generated, for example, by a compiler, by the manufacturing device controller, by the client terminal, by the computing device, and/or by a remote server.

Optionally, the code instructions are for execution by an additive manufacturing device controller of an additive manufacturing device for additive manufacturing of the FGM object.

Optionally, the code instructions are computed according to each of the sub-volumes of the volumetric representation of the FGM object.

Optionally, the code instructions for executing by the manufacturing device are computed according to a resolution capability of the manufacturing device.

Optionally, the code instructions are computed based on a conversion of the generic format of material properties of the volumetric representation of the FGM into a format suitable for a certain manufacturing device (e.g., 3D printer), for example, according to the hardware of the certain manufacturing device. For example, many 3D printers (e.g., the Connex printer described with reference to E L Doubrovski, E Y Tsai, D Dikovsky, J M P Geraedts, Hugh Herr, and Neri Oxman. *Voxel-based fabrication through material property mapping: A design method for bitmap printing. Computer-Aided Design*, 60:3-13, 2015) are designed to only receive a single material as input for each location (e.g., point and/or voxel). The mix of materials defined by the material trivariate(s) is converted into multiple corresponding single materials per pixel or voxel (or other format according to the definitions of the hardware of the manufacturing device). A single volumetric representation of the FGM is split into multiple volumetric representations, each volumetric representing denoting one respective material. For example, a color image of the volumetric representation of the FGM, where each color denotes a different material at the Euclidean location corresponding to respective pixels is divided into multiple binary maps, where each binary map is created for a different material, i.e., for a different color. The conversion may be performed, for example, by applying an error diffusion dithering method to the current sub-volume (e.g., represented as a 2D slice). Exemplary dithering process are described, for example, with reference to Robert W Floyd. *An adaptive algorithm for spatial grayscale. In Proc. Soc. Inf. Disp.*, volume 17, pages 75-77. SID, 1976, and/or Wonjoon Cho, Emanuel M Sachs, Nicholas M Patrikalakis, and Donald E Troxel. *A dithering algorithm for local composition control with three-dimensional printing. Computer-aided design*, 35(9): 851-867, 2003.

At 110, the computed volumetric representation of the FGM and/or the generated code instructions for execution by the manufacturing device (and/or controller) may be stored in a local memory, and/or transmitted to another computing device (e.g., to a server over the network). Alternatively or additionally, the sub-volumes may be stored. Alternatively or additionally, the Euclidean locations and associated material value(s) may be stored.

The computed volumetric representation of the FGM may include a generic (i.e., manufacturing device independent) definition of material properties, having a mix of two or more materials in a single location (e.g., pixel and/or voxel).

The volumetric representation of the FGM object may be stored in a generic format, enabling computation of code instructions for manufacturing of the FGM object by different manufacturing devices based on different input formats, for example, one bitmap image per material per slice.

For example, the volumetric representation may be stored as a file readable by a compiler that translates the file into code instructions for execution by the manufacturing device. The volumetric representation may be, for example, locally stored on the computing device, transmitted to a remote storage server and/or remote storage device, and/or stored by the client terminal accessing the computing device.

At 112, a physical FGM object having is manufacturing according to the manufacturing device controller executing the code instructions.

The physical FGM object may be manufactured by the manufacturing device depositing materials within Euclidean space according to the material value(s) defined for each respective location within the Euclidean space.

A tangible FGM object may be manufactured based on the instructions computed according to the volumetric representation of the FGM object. The FGM object may be manufactured, for example, in 2D (e.g., as a 2D-manifold, and/or a 2D structure on a surface), in 3D, and/or in 4D. Examples of manufacturing devices include: an additive manufacturing device for additive manufacturing of the FGM object, a 3D printer for 3D printing of the FGM object, a bioprinter for bioprinting of the FGM object, a 3D electronic printer, a fabrication machine for fabrication of the FGM object, a manufacturing device that manufactures parts for assembly by another device and/or parts that self assemble. The manufacturing device may implement different manufacturing methods, for example, based on a scallop, and/or temperature, and/or any combination of the aforementioned.

Reference is now made to FIG. 3, which includes pseudocode of a process for generating code instructions for a manufacturing device for a single sub-volume (e.g., 2D slice), in accordance to some embodiments of the present invention. Reference will be made to lines 302 of the pseudocode, which are numbered from 1 to 24. Lines 1-3 perform some preliminary calculations, such as determining the bounding rectangle of the slice for 3D printing, and the size of the bitmaps to provide to the 3D printer. The loop in lines 4 to 21, traverses over all $FGM_{cell(i)}$ in the input volumetric representation of the FGM object, and fills the correct pixels in the matrix (denoted $M_g$), for each cell. Inside the cell loop, the outline of the current cell is computed (line 6), and then a loop is run on each pixel (in lines 7 to 20) calculating the (u, v, w) value for each pixel. M is evaluated, in line 17, with those parameters to find the material parameters, which are saved in matrix $M_g$. The calculation of (u, v, w) is computed as described earlier. First in line 12, a fast numeric tracing method (e.g., Numeric-Solve) is used to find the correct unique solution to the equation describing the system of constraints (e.g., as described herein). If finding the solution fails, line 14 is executed using a FullSolver, which is the full, slower, solution for solving the system of constraint (e.g., using the solver described with reference to Iddo Hanniel and Gershon Elber. *Subdivision termination criteria in subdivision multivariate solvers using dual hyperplanes representations. Computer-Aided Design,* 39(5):369-378, 2007). Lines 22 to 23 are executed for performing the final steps, transforming the material parameters produced, into a bitmap for each material as needed by the selected 3D printer. These steps take $M_g$ with fractional material information, transform it, through dithering, into an image with one material per pixel, and then split the image into one binary bitmap per material. The trimmed trivariate volumes (e.g., as described with reference to Fady Massarwi and Gershon Elber. *A b-spline based framework for volumetric object modeling. Computer-Aided Design,* 78:36-47, 2016. SPM 2016) inherently support the modeling of any volume as geometrically mutually exclusive cells. This allows the use of a naive procedure that selects the last cell with non-empty material information for a pixel (as aside from along the boundaries, there should be exactly one such cell), and sets it as the material information for that pixel in $M_g$. It is noted that the support structure may be generated automatically by the selected 3D printer.

Figure 4:
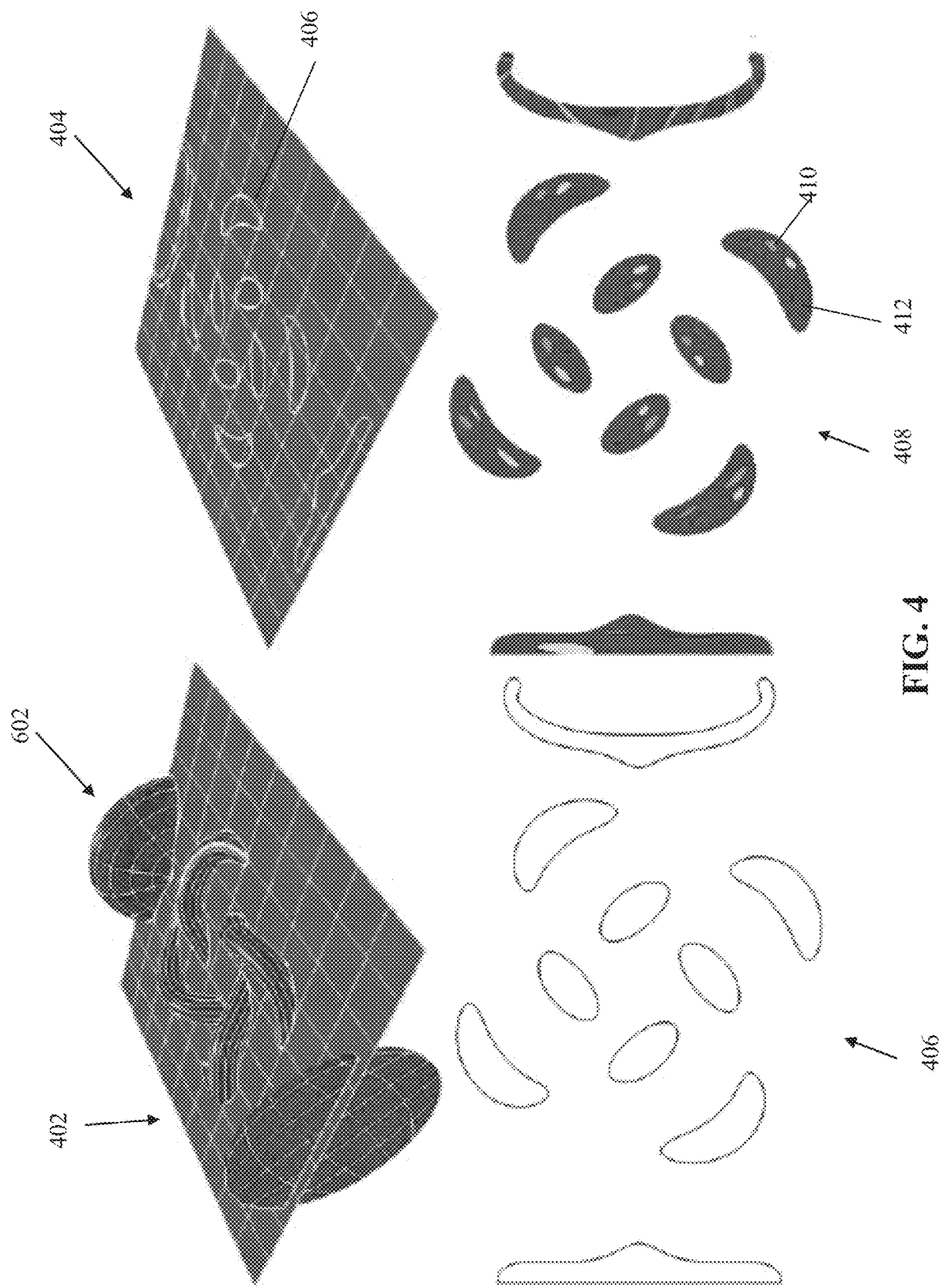
FIG. 4 is a schematic depicting the process of dividing the volumetric representation of the FGM into sub-volumes (i.e., 2D slices in the present case), in accordance with some embodiments of the present invention.

Reference is now made to FIG. 4, which is a schematic depicting the process of dividing the volumetric representation of the FGM into sub-volumes (i.e., 2D slices in the present case), in accordance with some embodiments of the present invention. The volumetric representation of the FGM object shown is chalice 602 with reference to FIG. 6. Chalice 602 is a trimmed v-rep model, created based on the systems, methods, apparatus, and/or code instructions described herein. Chalice 602 is intersected with multiple planes, one plane 402 is depicted. Planar outline 404 is created by the intersection of plane 402 with chalice 602. Outlines 406 (which are also shown in planar outline 404) are created from the intersection of chalice 602 and plane 402. Outlines 406 are shown without the rest of the intersecting plane. Outlines 406 of each slice (i.e., each sub-volume) are filled with material parameters (e.g., color coded pixels) 408 based on the values of the material trivariates that correspond to the outline 406 regions of the volumetric representation of the FGM (i.e., chalice 602). The outlines filled within material parameters 408 are processed to create instructions for manufacturing of the chalice. A manufactured chalice (shown as chalice 608 with reference to FIG. 6) is manufactured based on the outlines filled with material parameters 408. Colored fibers 610 of manufactured chalice 608 are located within a transparent material, which are correspondingly depicted within outlines filled with material parameters 408, as oval shaped geometric objects (e.g., one oval shaped geometric object 410 shown for clarity) within transparent material 412 filling the gap between the borders of the oval shaped geometric objects and the borders of the outlines.

Figure 7:
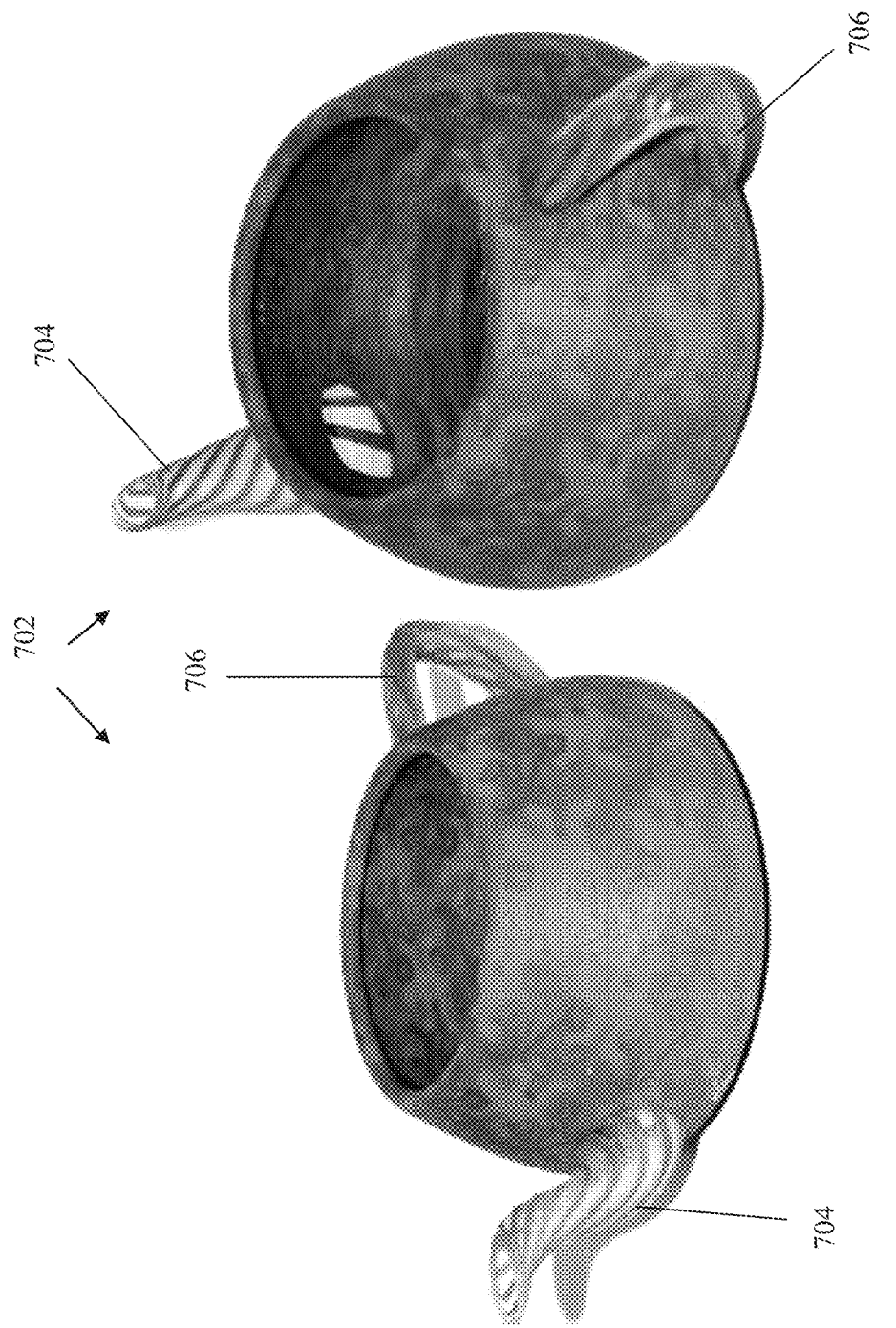
FIG. 7 is a physical FGM object created as a volumetric model of a Utah teapot (shown at two different views), in accordance with some embodiments of the present invention.

The embedding of colored fibers 610 within the manufactured chalice 608, and/or the coloring of the manufactured Utah teapot 702 descried with reference to FIG. 7 demonstrates the efficiency (e.g., relatively low computational cost in terms of processor utilization, processing time, and/or memory usage) of relating material parameters to geometry using the common parameterization of the domain common to the geometrical trivariate and the material trivariate. It is noted that other methods that do not use such as shared parameterization based on a common domain, such as voxels and/or B-rep representation, applying a volumetric texture that would follow the geometry is much more computationally complex, incurring higher computational costs (e.g., in terms of higher processor utilization, longer processing time, and/or increased memory usage).

Moreover, the embedding of colored fibers 610 within manufactured chalice 608 and/or the coloring of manufactured Utah teapot 702 demonstrate the computational efficiency obtained by reusing and applying the same texture to different volumetric representations of different FGM objects. For example, 2D textures as shown on manufactured Utah teapot 702 may be applied to different surfaces in traditional 2D texture mapping (e.g., as used in computer graphics) with computational efficiency.

Various implementations of at least some of the systems and/or methods and/or code instructions stored in a data storage device executed by one or more processors delineated hereinabove and as claimed in the claims section below find experimental support in the following examples.

EXAMPLES

Reference is now made to the following examples, which together with the above descriptions illustrate some implementations of the systems and/or methods and/or code instructions stored in a data storage device executed by one or more processors described herein in a non-limiting fashion.

Inventors implemented the systems and/or methods and/or code instructions described herein as C/C++ programs. The experiments described herein we run on an Intel i7-4770 3.4 Ghz Windows 7 machine (i.e., an implementation of the computing device described herein).

In a first experiment, the computational improvements of using numeric tracing instead of invoking the full solver (as described herein) were evaluated.

Figure 5:
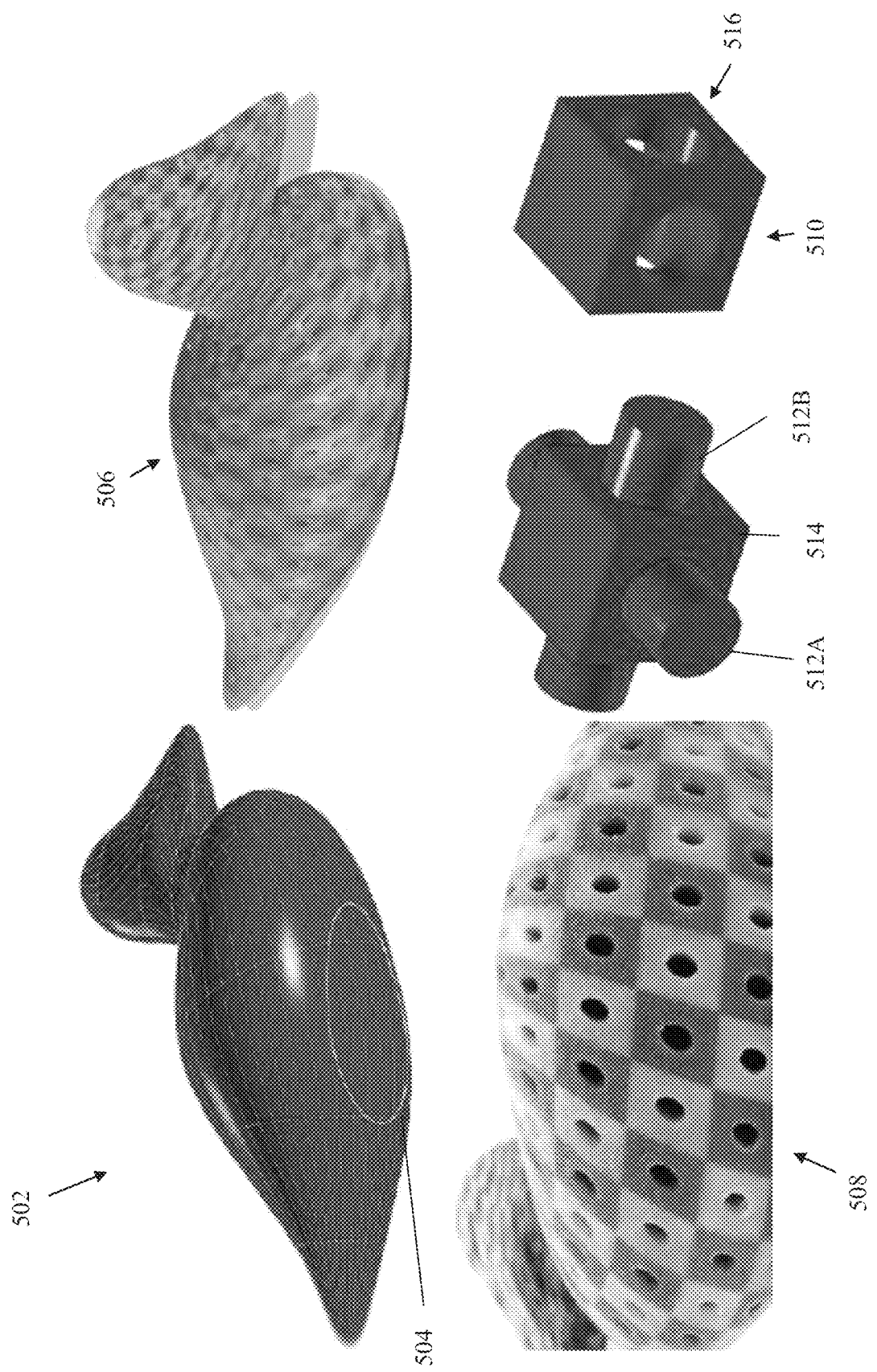
FIG. 5 is an image of a volumetric representation of an FGM object (i.e., trivariate volume) shaped like a duck, for illustrating the effects of the optimization based on numeric tracing, in accordance with some embodiments of the present invention.
Figure 6:
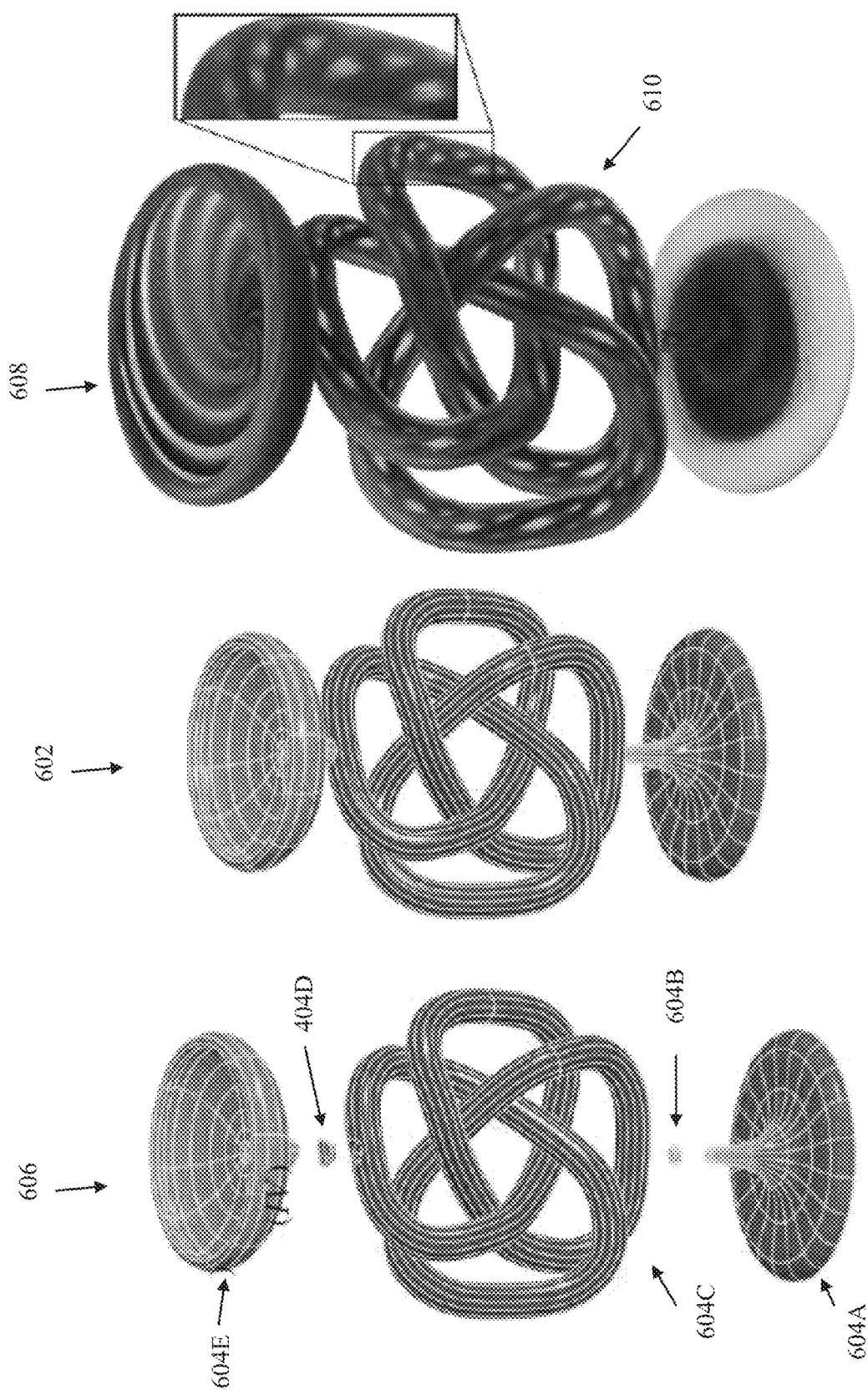
FIG. 6 is a 3D FGM object created as a volumetric model of a chalice, in accordance with some embodiments of the present invention.

Reference is now made to FIGS. 5, 6, and 7, which depict physical objects fabricated based on the systems, methods, apparatus, and/or code instructions described herein, in accordance with some embodiments of the present invention. The physical objects were printed on a Stratasys J750 printer with a Voxel Print interface allowing voxel level control, as described with reference to Stratasys Ltd. *Voxel print program.* http://www(dot)stratasys(dot)com/industries/education/research, 2016. The printer xy resolution was 600×300 DPI (each pixel is 0.0423 by 0.0846 millimeters), the resolution in the z axis is 0.03 millimeters per slice.

FIG. 5 is an image of a volumetric representation of an FGM object (i.e., trivariate volume) shaped like a duck 502, for illustrating the effects of the optimization based on numeric tracing, in accordance with some embodiments of the present invention. An outline of one slice 504 (i.e., sub-volume described herein) used to create instructions for manufacturing of the duck is marked. Fabricated duck 506 is manufactured by a 3D printer based on volumetric representation 502. Schematic 508 presents a different view of fabricated duck 506 showing more details of architecture of duck 506.

Volumetric representation of the FGM object (i.e., duck) 502 is based on a single piecewise-polynomial trivariate of orders (3, 3, 4). FIG. 5 shows how the original geometry may be modified by specifying locations where no material is present, allowing the fabrication of porous geometry that is made of heterogeneous materials. Specifying volume regions where no material is present may be used to apply a porous texture to the volumes of objects. In the case depicted by FIG. 5, the cavities within the trivariate model of duck 506 are procedurally defined by first dividing the volumetric representation of duck 502 cubic parametric domain into smaller boxes or tiles 510. Each tile 510 is a box 514 from which two orthogonal cylinders 512A-B are subtracted, creating a void 516. The coloring in the tiles of duck 516 is alternated (E.g., between green and blue in the present case) based on the index of the tile within the overall parametric domain.

The results of the experiments based on the duck of FIG. 5 are summarized in Table 1 below. Table 1 presents statistics on the user of the full solver, for different optimization methods, based on slice 504 of duck 502 depicted in FIG. 5.

TABLE 1

| Optimization method | Time (seconds) | Full solver (%) |
|---|---|---|
| None | 22590 | 100 |
| Previous point tracing | 71 | 0.2532 |
| Previous line tracing | 18 | 0.0205 |
| Full tracing | 15 | 0.0044 |

Table 1 summarizes the results of four different optimization methods for using numeric tracing. Optimization method "None" means no optimization was used. Optimization method "Previous point tracing" refers to where only the previous pixel in the line is used as an initial value for tracing. Optimization method "Previous line tracing" refers to where either the previous pixel in the line or the same pixel on the previous line are used as an initial value for tracing. Optimization method "Full tracing" refers to where any adjacent pixel on the current or previous lines (including diagonally placed pixels) are used as an initial value for tracing.

Two metrics were examined in the described experiments: "Time" denoting the time (in seconds) to calculate (u, v, w) values for all the pixels in the slice, and "Full solve" denoting the percentage for which the full solver was invoked. As the results in Table 1 show, using numeric tracing to avoid the use of the full solver brings about a great improvement in overall run time. Using the previous point optimization results in one full invocation of the full solver per line. Allowing the use of the pixel from the previous line further improves the results. The results presented in Table 1 show that when the optimization uses the results of any nearby pixels, the full solver needs to be invoked only a negligible number of times compared to the total number of pixels, which relatively improves computational efficiency of the computing device, for example, in terms of relatively reduced computational resource (e.g., processor(s)) utilization, relatively reduced computation time, and/or relatively reduced memory requirements.

FIG. 6 depicts a 3D FGM object created as a volumetric model of a chalice 602, in accordance with some embodiments of the present invention. Chalice 602 is a freeform V-rep model represented using trimmed trivariate B-spline functions that encode geometric and material properties, in accordance with some embodiments of the present invention. Schematic 606 depicts an exploded view of five volumetric cells 604A-E of chalice 602. Cells 604A, 604C, and 604E are included in one trivariate, whereas the two smaller cells 604B and 604D are unions of two different trivariates. Schematic 608 depicts the fabricated version of chalice 602.

Chalice 602 has five cells in the complex. Chalice 602 is created using Boolean operations on three trivariates: cup 604E, knot 604C, and base 604A. Five cells 604A-E were created overall: two cells 604B and 604D include the volumes where two of the three original trivariates intersect (i.e., 604B from intersection of 604A and 604C, and 604D from intersection of 604E and 604C), and three cells 604A, 604C, and 604E include single trimmed trivariate volumes, all represented as trimmed trivariates.

The representation of the 3G FGM object (i.e., chalice 602) includes two piecewise-polynomial trivariates of orders (4, 4, 4), and one piecewise-rational trivariate of orders (3, 4, 2), that result in five volumetric cells in the final representation of the 3D FGM object 602. A knot portion 604C may be described by the sweep of a disc along a knot shaped curve, while a cup 604E and a base 604A may be described using a rotation of surfaces. The volumetric representation of the 3D FGM object 602 was sliced along its length (as described with reference to FIG. 4). The material trivariate (i.e., composition function denoted M(u,v,w)) may be any function, as described herein. To create fabricated chalice 608, material composition was determined procedurally, using one function for each of the five cells 604A-E, with most of the volume printed in a transparent material, as depicted by manufactured chalice 608. Twisting colored fibers (shown as lines 610 in fabricated chalice 608) inserted into the model were defined in the parametric domain (of all five trimmed trivariates in the volumetric representation of the 3D FGM). For each $w=w_0$ plane in the parametric domain of V(u, v, w), several points (each with its own color) were specified. In each plane, the points are also rotated by an angle (or shifted a certain distance) dependent on the w parameter. When evaluating the material composition, any location whose distance in the u, v plane is less than some defined distance from one of the points is colored in the point color, otherwise the transparent material is used.

FIG. 7 shows a physical FGM object created as a volumetric model of a Utah teapot 702 (shown at two different views), in accordance with some embodiments of the present invention. The volumetric model of teapot 702 includes two piecewise-polynomial trivariates of orders (4, 4, 2) and one piecewise-polynomial trivariate of orders (4, 4, 4), that result in six disjoint volumetric cells in the final representation of the FGM object (i.e., the volumetric representation of the Utah teapot used to manufacture teapot 702), two from an intersection of a handle and a body, one from an intersection of a spout and the body, and three from single trimmed trivariate volumes of the original three trivariates. The material composition for the body of the teapot is determined by a 2D texture that was applied to the entire thickness of the hull (using only the u, v parts of the parameterization). The spout 704 and handle 706 are made from a rubber like transparent material, and have 3D twisting colored fibers embedded within, similar to the ones used in the chalice volumetric representation 602 described with reference to FIG. 6.

The time needed to generate the bitmaps for the representations of the FGM objects described with reference to FIGS. 5-7 generally depends on the volume of the geometry of the initial FGM object model, and/or on the number of printer voxels inside the initial FGM object model. Generating the bitmaps for the FGM object representation depicted in FIG. 5, which had about 2.69 billion voxels took about 30 hours using the computational resources described herein. However, as described herein, the bitmaps for each slice may be calculated independently, without relying on the bitmaps for other slices. Therefore, bitmap generating for multiple slices may be computed in parallel. Generating the bitmaps for the same FGM object model of FIG. 5, using four concurrent processes, took only about 8.5 hours, about 28 percent of the time needed for a single process.

Table 2 presents some statistics for the presented physically manufactured FGM objects, identified by corresponding Figure.

TABLE 2

| FIG. | Bitmap Size | # Slices | # Voxels Total, and Inside Model [×10⁹] | Average Time Per Slice (4 Threads) [sec] | Total Time (4 Threads) [hour] | Full Solve [%] |
|---|---|---|---|---|---|---|
| 4, 6 | (2944 × 1466) | 1914 | 8.2, 0.45 | 5.75 | 3.05 | 0.1033 |
| 7 | (2976 × 1477) | 2110 | 9.2, 0.54 | 3.14 | 1.84 | 0.1008 |
| 5 | (3040 × 1512) | 2918 | 13.4, 2.69 | 10.4 | 8.5 | 0.0055 |

The results show that, overall, the full solver was invoked very few times. Additionally actual failures of the numeric tracing method were virtually nonexistent in the experiments. The times increase when the number of model voxels increases, except for the chalice volumetric representation 602 described with reference to FIG. 6 that is significantly more complex (in terms of the underlying B-spline function) than the others. These presented times include writing the bitmaps to the disk, and are for four processes working concurrently.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant manufacturing devices will be developed and the scope of the term manufacturing device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of generating instructions for manufacturing of a functionally graded material (FGM) object, comprising:
   providing at least one geometric trivariate defining geometry of FGM object;
   providing at least one material trivariate defining at least one material property of the FGM object,
   wherein the at least one geometric trivariate and the at least one material trivariate comprises trimmed trivariates;

computing, by at least one hardware processor, a trimmed trivariate volumetric representation of the FGM object that includes the at least one geometric trivariate and the at least one material trivariate spanning a same parametric domain,
wherein the trimmed trivariate volumetric representation of the FGM object is based on a complex of a plurality of cells, wherein each cell is associated with a set of trimmed surfaces that trim the volume of the respective at least one geometric trivariate and the at least one material trivariate corresponding to the respective cell, wherein the set of trimmed surfaces define a boundary of the corresponding cell;
intersecting, by at least one hardware processor, the trimmed trivariate volumetric representation of the FGM object with a plurality of planes to create a plurality of slices;
creating, by at least one hardware processor, outlines for each respective slice from the intersection of the trimmed trivariate volumetric representation of the FGM object with each respective plane;
computing, by the at least one hardware processor, code instructions for execution by an additive manufacturing device controller of the additive manufacturing device for additive manufacturing of the FGM object by computing, for each slice of the plurality of slices:
identifying a plurality of locations within the outlines defined by the at least one geometric trivariate of the volumetric representation,
computing at least one respective material value for each of the plurality of locations within the outlines according to the at least one material trivariate of the volumetric representation corresponding to the identified plurality of locations,
converting the plurality of locations from the parametric domain to the Euclidean space,
wherein each of the plurality of locations in Euclidean space is associated with the at least one respective material value,
wherein the at least one respective material value is obtained by solving an inverse problem by iteratively computing from the Euclidean space back to a parametric location, for retrieving a respective location in the parametric domain for each respective location in the Euclidean space of each respective slice,
filling the plurality of location in Euclidean space within each outline of the respective slice with respective material values according to a format read by an additive manufacturing device for additive manufacturing the respective slice; and
providing the computed code instructions to the additive manufacturing device controller of the additive manufacturing device for additive manufacturing the FGM, by depositing materials within the Euclidean space of each respective outline of each respective slice according to the respective material value.

2. The method of claim 1, wherein each cell of the complex of the plurality of cells includes a single parameterization of the at least one geometric trivariate and the at least one material trivariate.

3. The method of claim 1, wherein each cell of the plurality of cells comprise control points and blending functions over the control points for the at least one geometric trivariate and/or the at least one material trivariate corresponding to the respective cell.

4. The method of claim 1, wherein each trivariate of at least one geometric trivariate and at least one material trivariate is regular with a non-vanishing Jacobian and without global self-intersections.

5. The method of claim 1, wherein the at least one geometric trivariate is independent of the at least one material trivariate, and the at least one material trivariate is independent of the at least one geometric trivariate.

6. The method of claim 1, wherein the at least one geometric trivariate and at least one material trivariate comprise parametric volumetric trivariates.

7. The method of claim 1, wherein the volumetric representation consists only of the at least one geometric trivariate and the at least one material trivariate spanning the same parametric domain.

8. The method of claim 1, wherein the slicing comprises slicing the trimmed trivariate volumetric representation of the FGM object into the plurality of slices having z dimensions determined according to hardware manufacturing capabilities of the manufacturing device.

9. The method according to claim 8, wherein the plurality of slices are computed in parallel and independently of another slice, and the identifying the plurality of locations, the computing at least one respective material value, and the converting the plurality of locations is performed in parallel per sub volume slice and independently of another slice.

10. The method according to claim 8, wherein the code instructions for execution by the manufacturing device controller further comprise sampling a plurality of sample locations of the at least one geometrical trivariate to determine whether each respective sample location falls within outlines of the respective slice, and computing the respective material value only for the respective sample location when the respective sample location falls within outlines of the respective slice.

11. The method according to claim 10, further comprising computing a full solution for a certain location within the outlines of the respective slice, and computing a plurality of solutions for a plurality of other close-by locations in proximity to the certain location based on a numeric tracing code that iteratively uses a previous solution of another location in proximity to the certain location as an initial guess of the solution of the certain solution.

12. The method according to claim 10, wherein sampling of locations includes at least one of: performed along straight lines aligned to the x or y axis, and performed as flood-fill.

13. The method according to claim 1, further comprising converting a mix of materials defined by the at least one material trivariate into a plurality of single materials per location, and splitting a single of the volumetric representation of the FGM into a plurality of volumetric representations each denoting one respective material.

14. The method of claim 1, wherein a single volumetric representation of the FGM object is computed based on the at least one geometric trivariate and the at least one material trivariate.

15. The method of claim 1, wherein the at least one material trivariate is selected from the group consisting of: a refinement of a spline space of the at least one geometric trivariates, a procedural function, a single function per cell of the volumetric representation of the FGM object, according to analysis results, and according to material features.

16. The method of claim 1, wherein instructions for manufacturing of each slice are computed by ignoring and/or preventing evaluation of locations falling outside of the outlines of each slice.

17. The method of claim 1, wherein each respective slice is at least one of: (i) represented as an image with one material per pixel and/or voxel, (ii) represented as an image that is split with one binary bitmap per material, (iii) transformed through dithering into an image, (iv) computed by finding a starting point and numerically marching from one pixel location to a next pixel location of an image representation of the respective slice.

18. A system for generating instructions for manufacturing of a FGM object, comprising:
a non-transitory memory having stored thereon a code for execution by at least one hardware processor, the code comprising:
code for obtaining at least one geometric trivariate defining geometry of FGM object;
code for obtaining at least one material trivariate defining at least one material property of the FGM object,
wherein the at least one geometric trivariate and the at least one material trivariate comprises trimmed trivariates;
code for computing a trimmed trivariate volumetric representation of the FGM object that includes the at least one geometric trivariate and the at least one material trivariate spanning a same parametric domain,
wherein the trimmed trivariate volumetric representation of the FGM object is based on a complex of a plurality of cells, wherein each cell is associated with a set of trimmed surfaces that trim the volume of the respective at least one geometric trivariate and the at least one material trivariate corresponding to the respective cell, wherein the set of trimmed surfaces define a boundary of the corresponding cell;
intersecting the trimmed trivariate volumetric representation of the FGM object with a plurality of planes to create a plurality of slices;
creating outlines for each respective slice from the intersection of the trimmed trivariate volumetric representation of the FGM object with each respective plane;
code for computing code instructions for execution by an additive manufacturing device controller of an additive manufacturing device for additive manufacturing of the FGM object by computing, for each slice of the plurality of slices:
identifying a plurality of locations within the outlines defined by the at least one geometric trivariate of the volumetric representation,
computing at least one respective material value for each of the plurality of locations within the outlines according to the at least one material trivariate of the volumetric representation corresponding to the identified plurality of locations,
converting the plurality of locations from the parametric domain to the Euclidean space,
wherein each of the plurality of locations in Euclidean space is associated with the at least one respective material value,
wherein the at least one respective material value is obtained by solving an inverse problem by iteratively computing from the Euclidean space back to a parametric location, for retrieving a respective location in the parametric domain for each respective location in the Euclidean space of each respective slice;
filling the plurality of location in Euclidean space within each outline of the respective slice with respective material values according to a format read by an additive manufacturing device for additive manufacturing the respective slice; and providing the computed code instructions to the additive manufacturing device controller of the additive manufacturing device for additive manufacturing the FGM, by depositing materials within the Euclidean space of each respective outline of each respective slice according to the respective material value.

19. A computer program product for generating instructions for manufacturing of a FGM object, comprising:
a non-transitory memory having stored thereon a code for execution by at least one hardware processor, the code comprising:
instructions for obtaining at least one geometric trivariate defining geometry of FGM object;
instructions for obtaining at least one material trivariate defining at least one material property of the FGM object,
wherein the at least one geometric trivariate and the at least one material trivariate comprises trimmed trivariates;
instructions for computing a trimmed trivariate volumetric representation of the FGM object that includes the at least one geometric trivariate and the at least one material trivariate spanning a same parametric domain,
wherein the trimmed trivariate volumetric representation of the FGM object is based on a complex of a plurality of cells, wherein each cell is associated with a set of trimmed surfaces that trim the volume of the respective at least one geometric trivariate and the at least one material trivariate corresponding to the respective cell, wherein the set of trimmed surfaces define a boundary of the corresponding cell;
instructions for intersecting the trimmed trivariate volumetric representation of the FGM object with a plurality of planes to create a plurality of slices;
instructions for creating outlines for each respective slice from the intersection of the trimmed trivariate volumetric representation of the FGM object with each respective plane;
instructions for computing code instructions for execution by an additive manufacturing device controller of an additive manufacturing device for additive manufacturing of the FGM object by computing, for each slice of the plurality of slices:
identifying a plurality of locations within the outlines defined by the at least one geometric trivariate of the volumetric representation,
computing at least one respective material value for each of the plurality of locations within the outlines according to the at least one material trivariate of the volumetric representation corresponding to the identified plurality of locations,
converting the plurality of locations from the parametric domain to the Euclidean space,
wherein each of the plurality of locations in Euclidean space is associated with the at least one respective material value,
wherein the at least one respective material value is obtained by solving an inverse problem by iteratively computing from the Euclidean space back to a parametric location, for retrieving a respective location in the parametric domain for each respective location in the Euclidean space of each respective slice;
instructions for filling the plurality of location in Euclidean space within each outline of the respective slice with respective material values according to a format read by an additive manufacturing device for additive manufacturing the respective slice; and instructions for providing the computed code instructions to the additive manufacturing device controller of the additive manufacturing device for additive manufacturing the FGM, by depositing materials within the Euclidean space of each respective outline of each respective slice according to the respective material value.

* * * * *